(12) United States Patent
Cassanova

(10) Patent No.: US 10,033,738 B2
(45) Date of Patent: Jul. 24, 2018

(54) METHODS, SYSTEMS, AND COMPUTER PROGRAM PRODUCTS FOR PROVIDING COMMUNICATIONS SERVICES

(71) Applicant: AT&T Intellectual Property I, L.P., Atlanta, GA (US)

(72) Inventor: Jeffrey Cassanova, Villa Rica, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/938,092

(22) Filed: Nov. 11, 2015

(65) Prior Publication Data

US 2016/0065583 A1 Mar. 3, 2016

Related U.S. Application Data

(63) Continuation of application No. 11/537,720, filed on Oct. 2, 2006.

(Continued)

(51) Int. Cl.
*H04L 29/06* (2006.01)
*G06Q 10/10* (2012.01)
(Continued)

(52) U.S. Cl.
CPC ............. *H04L 63/10* (2013.01); *G06Q 10/10* (2013.01); *G06Q 30/02* (2013.01); *H04L 51/04* (2013.01);
(Continued)

(58) Field of Classification Search
CPC ........... H04N 21/6125; H04N 21/6175; H04N 21/6402; H04N 21/6422
(Continued)

(56) References Cited

U.S. PATENT DOCUMENTS 5,872,588 A 2/1999 Aras et al.
6,055,305 A 4/2000 Norman et al.
(Continued)

FOREIGN PATENT DOCUMENTS

EP 1067772 A1 10/2001

OTHER PUBLICATIONS

K. Raza et al., "Large-Scale IP Network Solutions" Nov. 9, 1999, Cisco Press, Chapter 15, 2 pgs.
(Continued)

*Primary Examiner* — Yassin Alata
(74) *Attorney, Agent, or Firm* — Cantor Colburn LLP

(57) ABSTRACT

An aspect of providing communications services to Internet Protocol-enabled devices includes storing, in an account of the subscriber, a globally unique identifier for each of a plurality of the devices associated with the subscriber. For each of the devices, the globally unique identifier is appended to a network address of the subscriber in the account, where each of the devices is uniquely addressable via the appended globally unique identifier and network address. An aspect also includes provisioning a subscriber-selected communications service for the account, and assigning to the account subscriber-selected permissions for defining access to features of the communications service for individuals specified in the account with respect to a corresponding device. The permissions are assigned based on a combined user identifier and corresponding globally unique identifier. An aspect further includes providing the communications service to the individuals associated with the account subject to the permissions.

19 Claims, 25 Drawing Sheets

Related U.S. Application Data

(60) Provisional application No. 60/722,595, filed on Sep. 30, 2005.

(51) Int. Cl.
*G06Q 30/02* (2012.01)
*H04N 21/61* (2011.01)
*H04N 21/6402* (2011.01)
*H04N 21/643* (2011.01)
*H04L 12/58* (2006.01)
*H04L 29/08* (2006.01)

(52) U.S. Cl.
CPC ....... *H04L 67/306* (2013.01); *H04N 21/6125* (2013.01); *H04N 21/6175* (2013.01); *H04N 21/6402* (2013.01); *H04N 21/64322* (2013.01); *H04L 51/00* (2013.01)

(58) Field of Classification Search
USPC ... 725/39–49, 51, 86–92, 94, 100–104, 109, 725/111, 114, 119, 133, 134, 138–139, 725/141–144, 145, 151, 153
See application file for complete search history.

(56) References Cited

U.S. PATENT DOCUMENTS

| | | |
|---|---|---|
| 6,424,647 B1 | 7/2002 | Ng et al. |
| 6,560,323 B2 | 5/2003 | Gainsboro |
| 6,574,664 B1 | 6/2003 | Liu et al. |
| 6,614,780 B2 | 9/2003 | Hakim et al. |
| 6,618,858 B1 | 10/2003 | Gautier |
| 6,774,926 B1 * | 8/2004 | Ellis et al. ............ 348/14.01 |
| 6,937,612 B1 | 8/2005 | Mauger et al. |
| 6,983,312 B1 | 1/2006 | O'Neil |
| 7,024,211 B1 | 4/2006 | Martin |
| 7,054,661 B1 | 5/2006 | Kohli et al. |
| 7,136,882 B2 | 11/2006 | Collins |
| 7,272,639 B1 | 9/2007 | Levergood et al. |
| 7,362,745 B1 | 4/2008 | Cope et al. |
| 7,379,436 B2 | 5/2008 | Jiang |
| 7,472,424 B2 | 12/2008 | Evans et al. |
| 7,499,704 B1 | 3/2009 | Bonner |
| 7,616,942 B2 | 11/2009 | Karl et al. |
| 7,650,621 B2 | 1/2010 | Thomas et al. |
| 7,801,054 B2 | 9/2010 | Reichman |
| 7,890,552 B2 | 2/2011 | Reichman |
| 2001/0036192 A1 | 11/2001 | Chiles et al. |
| 2002/0016818 A1 | 2/2002 | Kirani et al. |
| 2002/0056123 A1 * | 5/2002 | Liwerant et al. ............ 725/87 |
| 2002/0104090 A1 | 8/2002 | Stettner |
| 2002/0107007 A1 | 8/2002 | Gerson |
| 2002/0122060 A1 | 9/2002 | Markel |
| 2002/0152461 A1 | 10/2002 | Istvan |
| 2002/0161627 A1 | 10/2002 | Gailey et al. |
| 2002/0161646 A1 | 10/2002 | Gailey et al. |
| 2002/0176403 A1 | 11/2002 | Radian |
| 2002/0197991 A1 | 12/2002 | Anvekar et al. |
| 2003/0002637 A1 | 1/2003 | Miyauchi et al. |
| 2003/0005446 A1 | 2/2003 | Jaff et al. |
| 2003/0027571 A1 | 2/2003 | Karlsson et al. |
| 2003/0046704 A1 | 3/2003 | Laksono et al. |
| 2003/0065873 A1 | 4/2003 | Collins et al. |
| 2003/0110503 A1 | 6/2003 | Perkes |
| 2003/0138088 A1 | 7/2003 | Costrell et al. |
| 2003/0177389 A1 | 9/2003 | Albert et al. |
| 2003/0192056 A1 | 9/2003 | Yun |
| 2003/0187956 A1 | 10/2003 | Belt et al. |
| 2004/0006688 A1 | 1/2004 | Pike |
| 2004/0037316 A1 * | 2/2004 | Choi et al. ............ 370/466 |
| 2004/0068739 A1 | 4/2004 | Russ et al. |
| 2004/0117831 A1 * | 6/2004 | Ellis .............. H04N 5/44543 725/53 |
| 2004/0119894 A1 | 6/2004 | Higgins et al. |
| 2004/0120494 A1 | 6/2004 | Jiang |
| 2004/0150518 A1 | 8/2004 | Phillips et al. |
| 2004/0187160 A1 | 9/2004 | Cook et al. |
| 2004/0218034 A1 | 11/2004 | Wang et al. |
| 2004/0240651 A1 | 12/2004 | Adams et al. |
| 2004/0252646 A1 | 12/2004 | Adhikari et al. |
| 2004/0258046 A1 | 12/2004 | Wu et al. |
| 2004/0261093 A1 | 12/2004 | Rebaud et al. |
| 2004/0264656 A1 | 12/2004 | Walsh et al. |
| 2004/0268406 A1 | 12/2004 | Sparrell |
| 2005/0028191 A1 | 2/2005 | Sullivan et al. |
| 2005/0050160 A1 | 3/2005 | Upendran et al. |
| 2005/0079875 A1 | 4/2005 | Carlson |
| 2005/0232247 A1 | 10/2005 | Whitley et al. |
| 2005/0239447 A1 | 10/2005 | Holzman et al. |
| 2005/0240959 A1 | 10/2005 | Kuhn et al. |
| 2005/0251827 A1 | 11/2005 | Ellis |
| 2005/0267803 A1 | 12/2005 | Patel et al. |
| 2006/0010468 A1 | 1/2006 | Loughridge et al. |
| 2006/0041655 A1 | 2/2006 | Holloway et al. |
| 2006/0074747 A1 | 4/2006 | Kline et al. |
| 2006/0089827 A1 | 4/2006 | Gabele et al. |
| 2006/0089980 A1 | 4/2006 | Nomura |
| 2006/0115062 A1 | 6/2006 | Gonder |
| 2006/0153355 A1 | 7/2006 | Wang et al. |
| 2006/0183459 A1 | 8/2006 | Kohli et al. |
| 2006/0280165 A1 | 12/2006 | Blumenschein et al. |
| 2006/0293057 A1 | 12/2006 | Mazerski |
| 2007/0011260 A1 | 1/2007 | Chiu |
| 2007/0041526 A1 | 2/2007 | Hill et al. |
| 2007/0047523 A1 | 3/2007 | Jiang |
| 2007/0078785 A1 | 4/2007 | Bush et al. |
| 2007/0115389 A1 | 5/2007 | McCarthy et al. |
| 2007/0121584 A1 | 5/2007 | Qiu |
| 2007/0058569 A1 | 6/2007 | McMenamin et al. |
| 2007/0140299 A1 | 6/2007 | Hofmann |
| 2007/0206773 A1 | 9/2007 | Branam |
| 2007/0208619 A1 | 9/2007 | Branam et al. |
| 2007/0209054 A1 | 9/2007 | Cassanova |
| 2007/0209065 A1 | 9/2007 | Branam et al. |
| 2007/0220553 A1 | 9/2007 | Branam et al. |
| 2007/0275690 A1 | 11/2007 | Hunter et al. |
| 2008/0013531 A1 | 1/2008 | Elliott et al. |
| 2008/0025295 A1 | 1/2008 | Elliott et al. |
| 2008/0112363 A1 | 5/2008 | Rahman et al. |
| 2008/0159276 A1 | 7/2008 | Kuusinen et al. |
| 2008/0187120 A1 | 8/2008 | Walsh et al. |
| 2008/0240383 A1 | 10/2008 | Fronczak et al. |
| 2009/0022142 A1 | 1/2009 | Delorme et al. |
| 2009/0022143 A1 | 1/2009 | Cassanova et al. |
| 2009/0052644 A1 | 2/2009 | Wood et al. |
| 2009/0191869 A1 | 7/2009 | Siegel et al. |
| 2009/0214013 A1 | 8/2009 | Cassanova et al. |
| 2010/0040025 A1 | 2/2010 | Karaoguz et al. |
| 2010/0058407 A1 | 3/2010 | Lafreniere et al. |
| 2010/0058408 A1 | 3/2010 | Lafreniere et al. |
| 2010/0095337 A1 | 4/2010 | Dua |
| 2010/0189236 A1 | 7/2010 | MacDonald |
| 2010/0215162 A1 | 8/2010 | Gupta |
| 2011/0110302 A1 | 5/2011 | Faurie et al. |

OTHER PUBLICATIONS

K. Siyan et al., "Windows 2000 Server Professional Reference" Jul. 10, 2000, Third Edition, Sams, Chapter 22, 2 pgs.
New Intel Set-Top Box Reference Design Runs CE, .NET, XP Embedded, Windows for Devices.com, Sep. 23, 2003.

* cited by examiner

METHODS, SYSTEMS, AND COMPUTER PROGRAM PRODUCTS FOR PROVIDING COMMUNICATIONS SERVICES

CROSS-REFERENCE TO RELATED APPLICATIONS

This application is a continuation application of U.S. application Ser. No. 11/537,720 filed Oct. 2, 2006 which claims the benefit of U.S. Provisional Application Ser. No. 60/722,595, entitled METHODS, SYSTEMS AND COMPUTER PROGRAMS FOR PROVIDING INTERNET PROTOCOL TELEVISION SERVICES, filed on Sep. 30, 2005, the contents of which are incorporated by reference herein in its entirety. This application is related to commonly assigned U.S. application Ser. No. 11/537,708, entitled METHODS, SYSTEMS, AND COMPUTER PROGRAM PRODUCTS FOR PROVIDING NETWORK CONVERGENCE OF APPLICATIONS AND DEVICES, filed on Oct. 2, 2006. This application is also related to commonly assigned U.S. patent application Ser. No. 11/537,711, entitled METHODS, SYSTEMS, AND COMPUTER PROGRAM PRODUCTS FOR PROVIDING CUSTOMIZED CONTENT, filed On Oct. 2, 2006. This application is also related to commonly assigned U.S. Pat. No. 7,801,054, entitled METHODS, SYSTEMS, AND COMPUTER PROGRAM PRODUCTS FOR IMPLEMENTING NETWORK VISUALIZATION SERVICES, filed On Oct. 2, 2006. This application is also related to commonly assigned U.S. Pat. No. 7,890,552, entitled METHODS, SYSTEMS, AND COMPUTER PROGRAM PRODUCTS FOR IMPLEMENTING MEDIA CONTENT ANALYSIS, DISTRIBUTION, AND RE-ALLOCATION SERVICES, filed On Oct. 2, 2006. This application is also related to commonly assigned U.S. Pat. No. 8,223,938, entitled METHODS, SYSTEMS, AND COMPUTER PROGRAM PRODUCTS FOR PROVIDING CALLER IDENTIFICATION SERVICES, filed On Oct. 2, 2006. This application is also related to commonly assigned U.S. application Ser. No. 11/537,724, entitled METHODS, SYSTEMS, AND COMPUTER PROGRAM PRODUCTS FOR PROVIDING TARGETED ADVERTISING TO COMMUNICATIONS DEVICES, filed On Oct. 2, 2006. This application is also related to commonly assigned U.S. Pat. No. 8,804,695, entitled METHODS, SYSTEMS, AND COMPUTER PROGRAM PRODUCTS FOR PROVIDING ALERTS AND NOTIFICATIONS, filed On Oct. 2, 2006. Each of the above applications is incorporated by reference herein in its entirety.

BACKGROUND OF THE INVENTION

The present invention relates generally to communications, and more particularly, to methods, systems, and computer program products for providing communications services to Internet Protocol-enabled communications devices.

In order to stay competitive, communications service providers are seeking new ways to enhance customer satisfaction, over and above the current voice telephony services. Text messaging, picture messaging, and other services have proven to be popular additions to existing communications service packages. Services, such as text messaging, provide convenience, flexibility, and seamless integration with existing voice services.

The demand for these value-added services has provided communications service providers with additional sources of revenue. As advances in communications technologies continue to be realized, the need and demand for these and other value-added services will most likely continue to be exploited by service providers and their competitors.

BRIEF SUMMARY OF THE INVENTION

Exemplary embodiments include methods, systems, and computer program products for providing communications services to Internet Protocol-enabled devices associated with a subscriber. A method includes providing communications services to Internet Protocol-enabled devices includes storing, in an account of the subscriber, a globally unique identifier for each of a plurality of the devices associated with the subscriber. For each of the devices, the globally unique identifier is appended to a network address of the subscriber in the account, where each of the devices is uniquely addressable via the appended globally unique identifier and network address. The method also includes provisioning a subscriber-selected communications service for the account, and assigning to the account subscriber-selected permissions for defining access to features of the communications service for individuals specified in the account with respect to a corresponding device. The permissions are assigned based on a combined user identifier and corresponding globally unique identifier. The method further includes providing the communications service to the individuals associated with the account subject to the permissions.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

Figure 1:
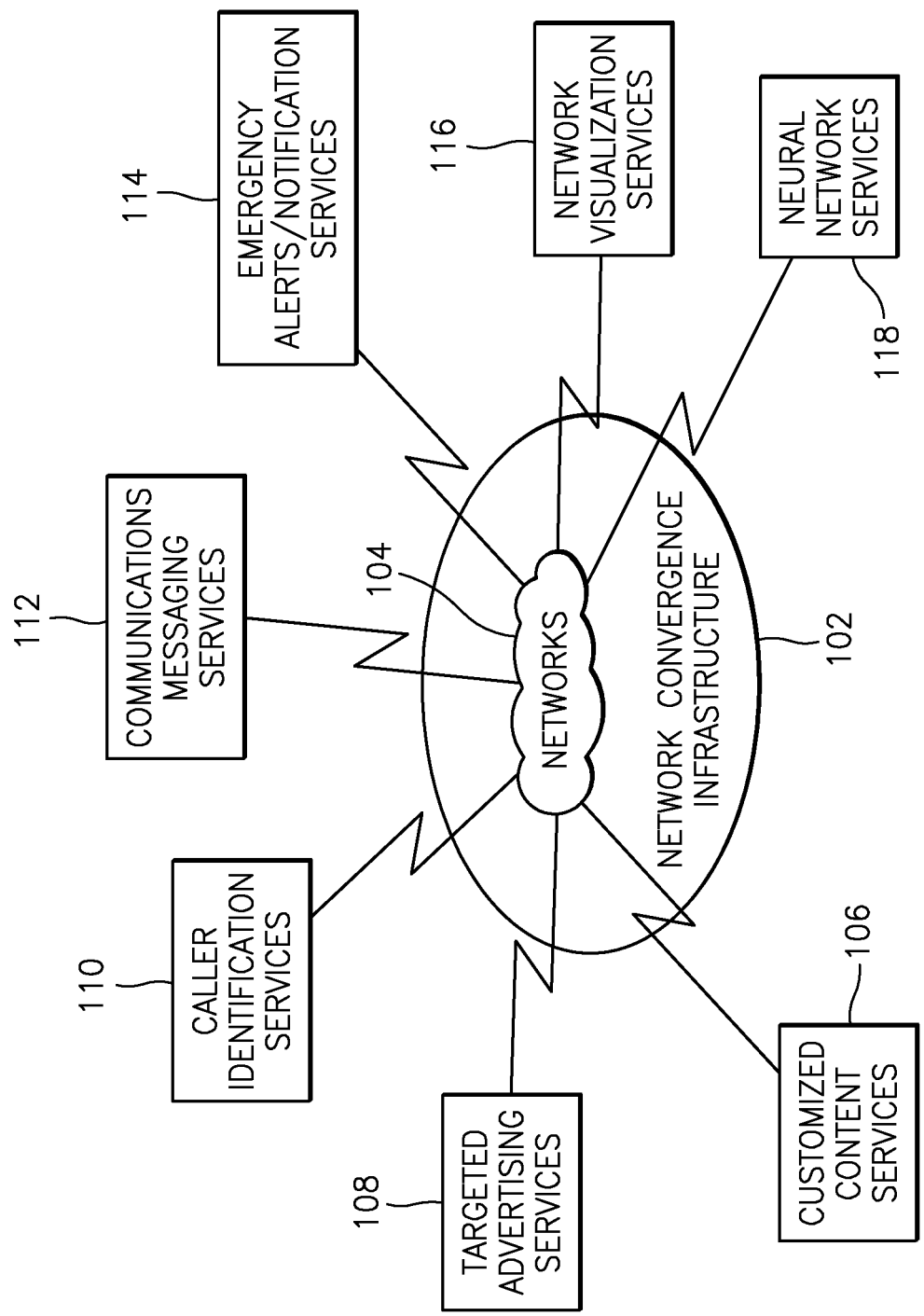
FIG. 1 is a block diagram of a network convergence infrastructure for providing consolidated system services in accordance with exemplary embodiments.

Turning now to FIG. 1, a generalized depiction of a network convergence infrastructure is shown, which provides consolidated system services to users of communications devices, as well as to associated business enterprises. The network convergence infrastructure 102 integrates applications and devices that operate over multiple types of network systems. The network convergence infrastructure 102 integrates applications and services provided, e.g., over circuit-switched networks and packet-switched networks, such as networks 104 as described further herein. The networks may utilize various transmission protocols and technologies, such as Internet Protocol (IP), asynchronous transfer mode (ATM), and frame relay protocols for transmitting data. The network convergence infrastructure 102 may include a diverse set of network elements, such as, e.g., hubs, switches, routers, trunks, etc. In addition, signaling and transmission protocols, such as signaling system 7 (SS7), 802.11, GR1188, TCP/IP, SIP, and others may be implemented via the network convergence infrastructure 102 as described further herein.

The types of services that may be provided via the network convergence infrastructure 102 include, e.g., customized content services 106, targeted advertising services 108, caller identification services 110, communications messaging services 112, emergency alerts/notification services 114, network visualization services 116, and neural network services 118. It will be understood that additional services may be implemented via the network convergence infrastructure 102, including, e.g., information services, e-commerce activities, etc. The network convergence infrastructure 102 is described in greater detail in FIGS. 2 and 3. The customized content services 106 are described in greater detail in FIGS. 4 through 8. The targeted advertising services 108 are described in greater detail in FIGS. 9 through 11. The caller identification services 110 are described in further detail in FIGS. 12 through 15. The communications messaging services 112 are described in further detail in FIGS. 16 and 17. The emergency alerts/notification services 114 are described in further detail in FIGS. 18 and 19. The network visualization services 116 are described in further detail in FIGS. 18 and 20 through 24. The neural network services 118 are described in greater detail in FIGS. 18 and 25.

Figure 2:
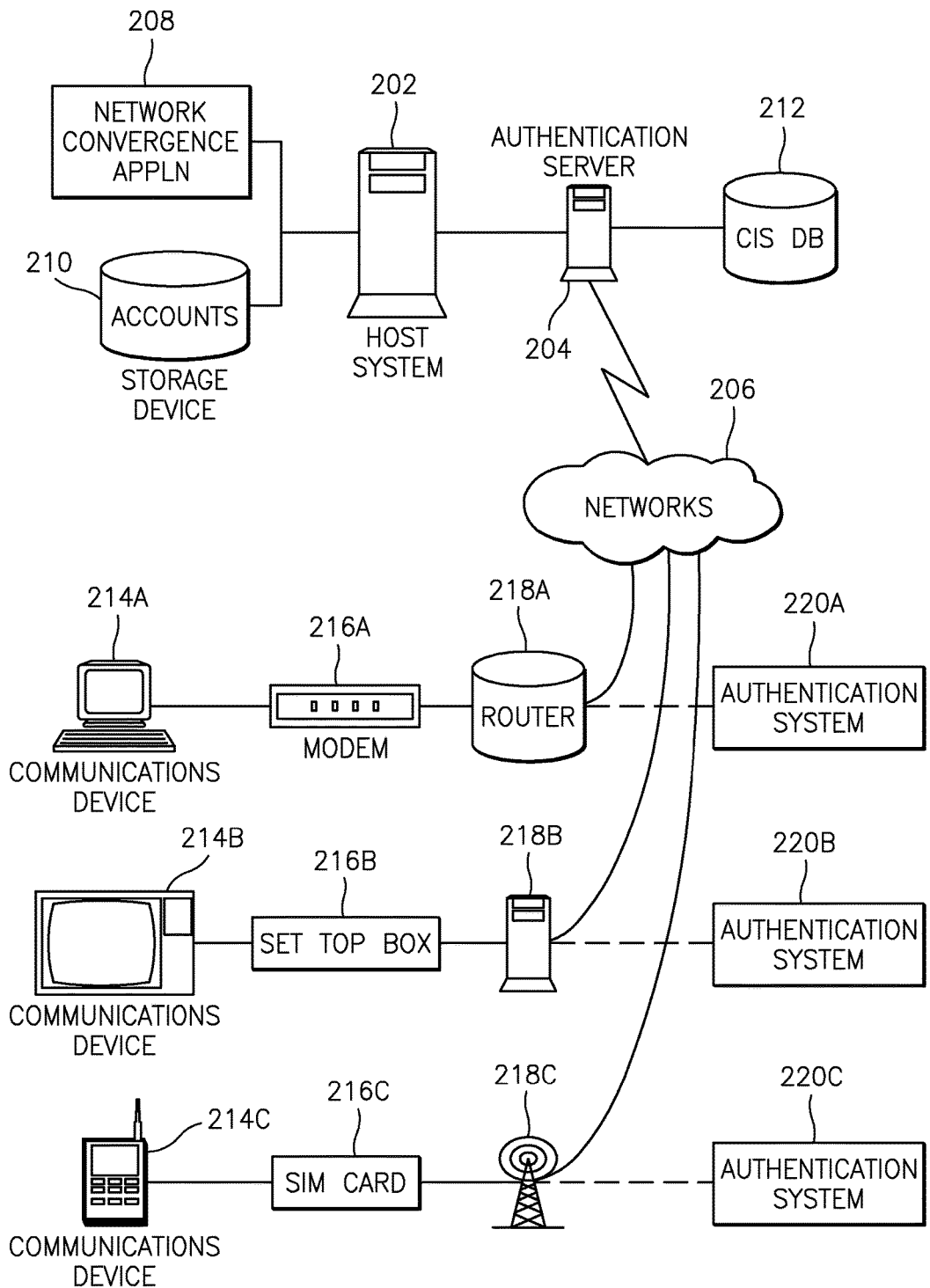
FIG. 2 is a block diagram a portion of the network convergence infrastructure for use in establishing and utilizing a network convergence service account in accordance with exemplary embodiments.

Turning now to FIG. 2, a portion of the network convergence infrastructure 102 will now be described in accordance with exemplary embodiments. The network convergence infrastructure 102 provides a means for accessing network services for multiple disparate devices using a single sign on procedure. The network convergence infrastructure 102 manages accounts, each of which is established for a community of devices and/or device users. These accounts may then be used to provide access to the consolidated system services 106-118 as described further herein.

As shown in FIG. 2, a host system 202 is in communication with an authentication server 204 and communications devices 214A-214C via one or more networks 206. Host system 202 may be implemented using a high-speed processing device (e.g., a computer system) that is capable of handling high volume activities conducted via communications devices (e.g., communications devices 214A-214C), and other network entities (e.g., authentication server 204). Host system 202 may be implemented by a network service provider, content service provider, or other enterprise.

Communications device 214A may be a computer device, such as a general-purpose desktop or laptop system that operates over one or more of networks 206 via an access technology such as, but not limited to, digital subscriber line (DSL) technology, cable modem technology, or dial-up technology. Communications device 214B may be an Internet Protocol-enabled television (IPTV). Communications device 214C may be a mobile telephone that operates over a wireless network (e.g., one of networks 206) using various wireless protocols. In exemplary embodiments, at least one of communications devices 214A-214C establishes an account that is managed by the provider enterprise of host system 202. For example, communications device 214A may receive Internet services from the provider enterprise of host system 202. As such, an account record may be generated for the user of communications device 214A that identifies the user and the account for which the services are provided. Account information and records (also referred to herein as 'network convergence account records') may be stored in a storage device accessible by the host system 202, such as storage device 210.

In exemplary embodiments, communications devices 214A-214C are owned/operated by one or more individuals that share some relationship (e.g., members of a household). While only three communications devices 214A-214C are shown in FIG. 2, it will be understood that many such communications devices may be used to form a community of communications devices. For example, a wireline PSTN telephone, SIP telephone, dual-mode mobile telephone, personal digital assistant (PDA), or other type of communications device may be included in the system of FIG. 2. The host system 202 implements one or more applications for establishing and utilizing a network convergence service account. These one or more applications are collectively referred to herein as a network convergence application 208. A network convergence service account may be created for a community of communications devices (e.g., devices 214A-214C) as described herein.

Authentication server 204 may be implemented using a high-speed processing device (e.g., a computer system) that is capable of handling high volume activities conducted via communications devices (e.g., communications devices 214A-214C), and other network entities (e.g., router 218A, server 218B, base station or cell tower 218C, etc.) via one or more networks (e.g., networks 206). Authentication server 204 receives requests from one or more communications devices 214A-214C either to establish a network convergence service account or to access network services (e.g., consolidated system services 106-118). Authentication server 204 may implement authentication software for restricting or controlling access to network services provided by the host system 202. Authentication server 204 may be in communication with a customer identity system (CIS) database 212, which stores user credentials (e.g., user names and passwords) established via the network convergence application 208.

According to an exemplary embodiment, the system of FIG. 2 includes a modem 216A communicatively coupled to communications device 214A and router 218A, a set top box 216B communicatively coupled to communications device 214B and server 218B, and a subscriber identity module (SIM) card 216C communicatively coupled to communications device 214C and base station 218C. Further, authentication systems 220A-220C are in communication with router 218A, server 218B, and 218C, respectively. These network elements are described further herein.

As indicated above, networks 206 may include circuit-switched and/or packet-switched technologies and devices, such as routers, switches, hubs, etc., for facilitating communications between communications devices 214A-214C and authentication server 204. Networks may include wireline and/or wireless components utilizing, e.g., 802.11 standards for providing over-the-air transmissions of communications.

Figure 3:
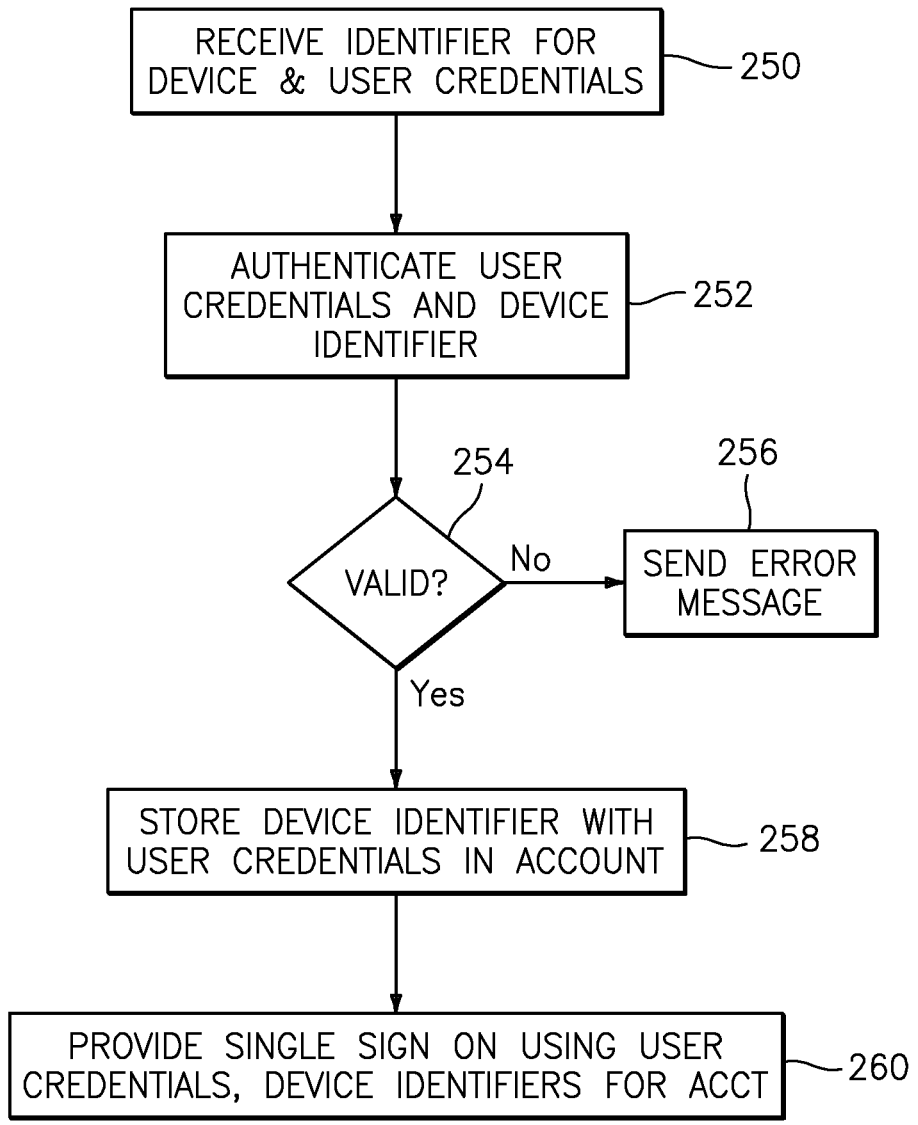
FIG. 3 is a flow diagram describing a process for establishing and utilizing a network convergence service account via the network convergence infrastructure in exemplary embodiments.

In exemplary embodiments, a communications device is provisioned for the network convergence infrastructure 102 by associating a device identifier of the communications device with a respective account. The account, in turn, identifies each of the communications devices belonging to the community and provides other information as described herein. Turning now to FIG. 3, a process for establishing and utilizing a network convergence service account via the network convergence infrastructure 102 will now be described in exemplary embodiments. While not necessary to realize the advantages of the embodiments, the process described in FIG. 3 assumes that at least one of the communications devices 214A-214C has been provisioned for receiving access to network services provided by the host system 202. For example, a user of communications device 214A may have established an account with the host system 202 for receiving Internet access, e.g., DSL services. It is also assumed that communications devices 214B and 214C are inactive (e.g., recently purchased and unprovisioned). In addition, it is assumed that all of communications devices 214A-214C are associated with a single user or a community of users (e.g., household members). One or more of the communications devices 214A-214C may be co-located in a customer premises.

A user of a communications device (e.g., 214C) requests provisioning of the device 214C for receiving mobile telephone services. For example, at the time of cellular service provisioning, the user may be prompted to receive the network convergence services (e.g., via voice or text message at the device). A unique identifier provided in the SIM card 216C of the communications device 214C may be used as a device identifier by the network convergence application 208. In addition, the user may be asked to enter user credentials (e.g., user name and password associated with the account, or other account information) in order to authenticate the user with the host system 202. Likewise, at the time of provisioning, a user of communications device 214B may be prompted via set top box 216B and the display on communications device 214B to enter user credentials for authentication. The device identifier used to identify the communications device 214B may be a unique identifier (e.g., globally unique identifier (GUID), a MAC address, serial number, etc.) assigned to the set top box 216B during manufacture.

In either case, according to exemplary embodiments, a one time only provisioning authentication occurs for the device (e.g., 214B or 214C) by transmitting the device identifier (e.g., SIM number or GUID) and user credentials to the respective authentication systems 220. For communications device 214B, this transmission may occur via set top box 216B and server 218B to authentication system 220B. For communications device 214C, this transmission may occur via SIM card 216C and base station 218C to authentication system 220C. Different authentication systems 220A-220C are implemented based upon the particular type of communications device and network service.

In addition, the device identifier and user credentials are also received by authentication server 204 at step 250. At step 252, the user credentials and device identifier are authenticated. For example, the authentication server 204 determines if the user credentials stored in the network convergence service account (in storage device 210) are valid. In addition, the authentication server 204 receives information from the relevant authentication system 220 for the communications device. At step 254, it is determined whether the user credentials and device identifier are valid. If not, an error message is generated and transmitted to the communications device at step 256. Otherwise, the device identifier is stored with the user credentials in the CIS database 212 at step 258. The network convergence service account record is updated to reflect the new communications device 214C.

At step 260, the user credentials and device identifier are used to provide a single sign on for the user associated with the account. The network convergence application 208 utilizes the user credentials and device identifiers in the network convergence service account to route a sign on request from respective devices to authentication server 204 for providing a single sign on credential.

Once the community of communications devices 214A-214C has been provisioned and the user credentials/device identifiers have been stored in the network convergence service account, these devices may then access the consolidated system services 106-118 as described further herein.

As indicated above, the consolidated system services include customized content services 106. The customized content services 106 enable users of IPTV communications devices, e.g., communications device 214B, to customize content received on the device, as well as access other services. According to exemplary embodiments, types of programming, program content provider preferences, parental controls, and interactive communications including electronic purchasing, are among the many services provided via the customized content services 106.

Figure 4:
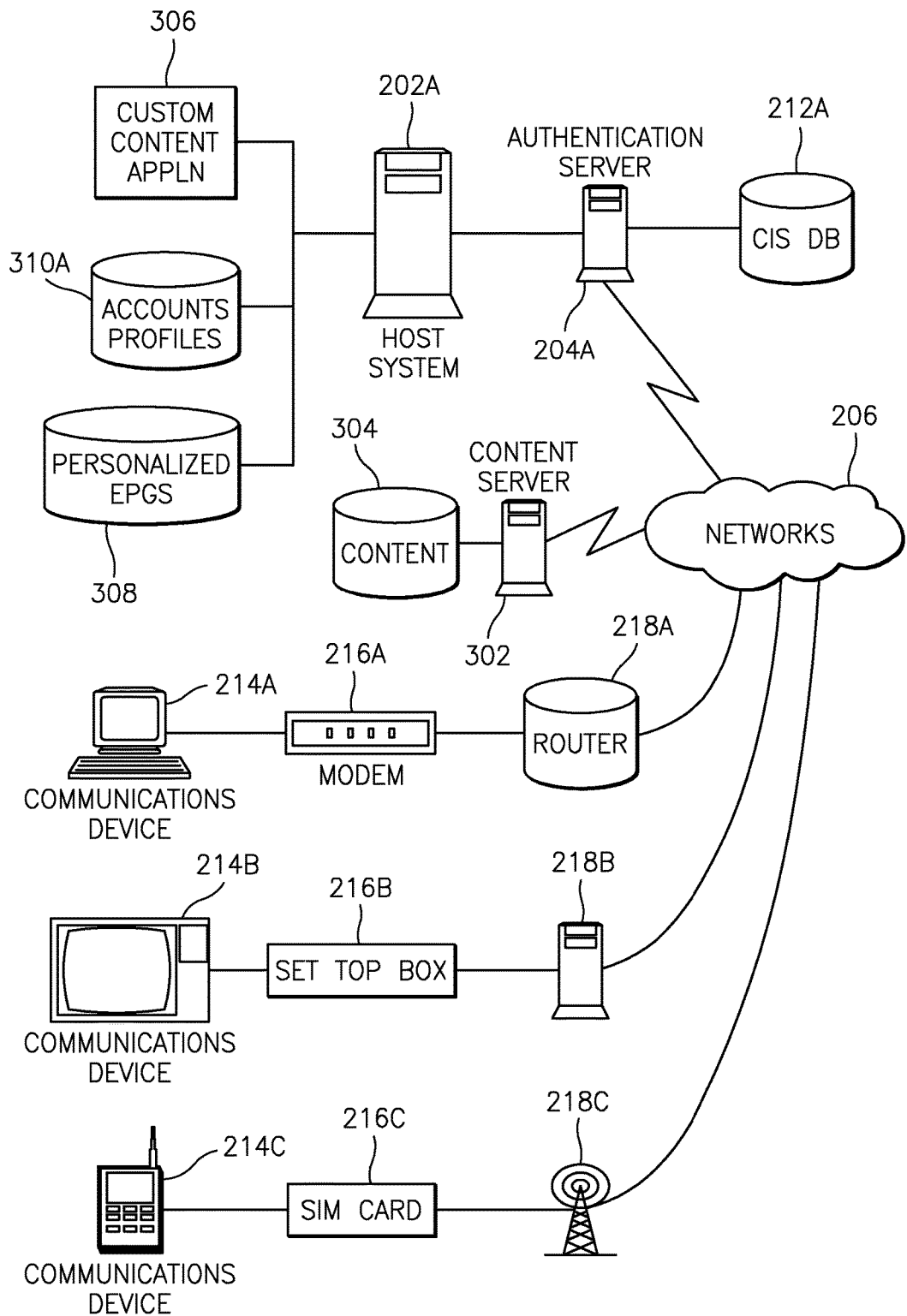
FIG. 4 is a block diagram of a portion of the network convergence infrastructure for implementing customized content services in exemplary embodiments.

Turning now to FIG. 4, a block diagram of a portion of the network convergence infrastructure 102 for implementing customized content services 106 will now be described in exemplary embodiments. The system of FIG. 4 includes elements similar to those described in FIG. 2. To this extent, these elements will not be further described.

According to an exemplary embodiment, the system of FIG. 4 includes a content server 302 in communication with host system 202A, authentication server 204A, and communications devices 214A-214C over networks 206. Content server 302 may be implemented at a video head end office (VHO), regional video services office (VSO) or other source of content that distributes programming, news, gaming, etc., on a local, national, or international basis. While only one content server 302 is shown for ease of illustration, it will be understood that content server 302 may be one of many content servers 302 in communication with the network convergence infrastructure 102 of FIG. 4. These content servers may provide a variety of content over an IP-based network. The content may include premium channels, broadcast programming, and Internet-based matter. The content provided by content servers may include, e.g., news, sports, weather, business, shopping, traffic, stocks, etc., and may provide a range of content types, such as health and fitness, documentaries, comedy, science fiction, action/adventure, honor, romance, drama, etc., over IP-based network. A user of the customized content services 106 may designate preferred content providers and preferred content, as well as preferred localized content with respect to, e.g., weather, traffic, etc.

Host system 202A executes a custom content application 306 for facilitating the customized content services 106 described herein. Users of communications devices 214A-214C, who have established a network convergence service account (FIG. 2) may establish personalized electronic programming guides for customizing the content provided by content sources (e.g., content server 302). In addition, a separate identity for each IPTV-enabled communications device (e.g., communications device 214B) associated with the account may be established for further personalizing the content received by users in the account. Although the following description references the communications device 214B as being IPTV-enabled, it should be appreciated that other communications devices (e.g., 214A and/or 214C) may also be IPTV-enabled and may request and display personalized electronic programming guides as discussed below with regard to communications device 214B.

The custom content application 306 may provide a user interface via a display screen of the communications device 214B such that a user of the device 214B may be prompted to establish a personalized electronic programming guide. The options provided by the user interface may be selected via input features and functions (e.g., up/down, left/right arrow keys, 'select' key, etc.) provided on the communications device 214B, the display screen of the communications device 214B, or on a remote control device associated with the communications device 214B.

In addition, a set top box (e.g., 216B) associated with the communications device 214B may be configured to send a unique device identifier (e.g., GUID, MAC address, serial number, etc.) to the host system 202A, which in turn, initiates the custom content application 306. In this embodiment, the custom content application 306 presents the user interface options on the communications device 214B and associates results of the user's selections with the device identifier. Further, the device identifier may then be used, along with the user's network address, or PPPoE address, provided in the account to designate a transmission address for distributing the customized content. For example, if the GUID is used as a device identifier and the user's credentials are "PPPoE@networkdomainaddress.non", the custom content application 306 creates a network address: "GUID#.PPPoE@networkdomainaddress.non". In this manner, the device 214B itself becomes a separate 'user' in the account.

Once a user registers the device with the host system 202A, the user may be prompted via the communications device 214A to rename the device (e.g., LIVING-ROOM_TV, JOEYS_BDRM_TV, etc.). The custom content application 306 stores the new user credentials (i.e., the device identifier and PPPoE information) in the customer identity store 212A. Future requests from users to access content via the custom content application 306 will be authenticated by authentication server 204A as the device has been provisioned for the network services, as well as the customized content services 106. If a user chooses not to 'log in' to the account prior to accessing content on the communications device 214B, the user will be presented with content as typically implemented in the art.

Figure 5:
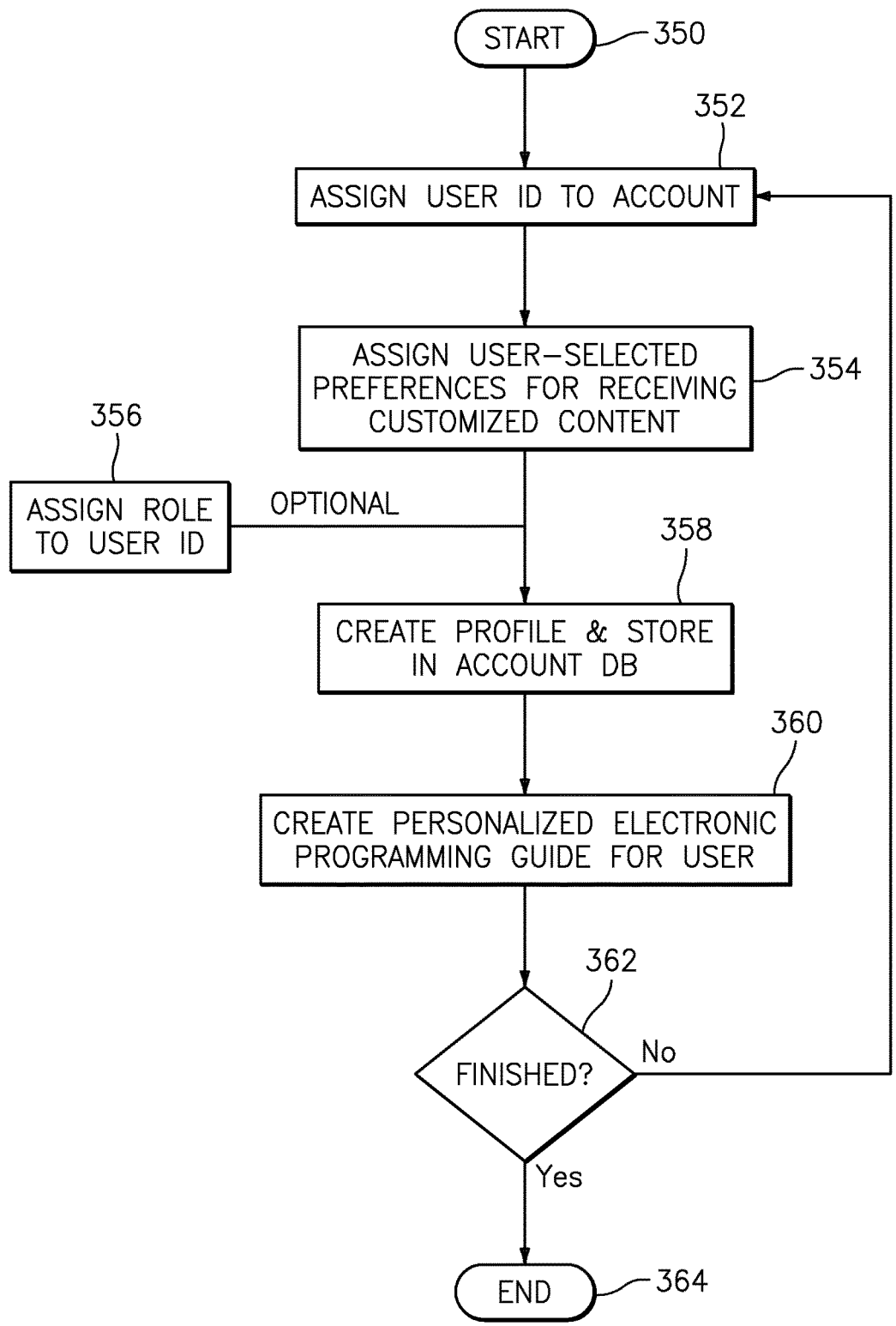
FIG. 5 is a flow diagram describing a process for implementing the customized content services in exemplary embodiments.
Figure 6:
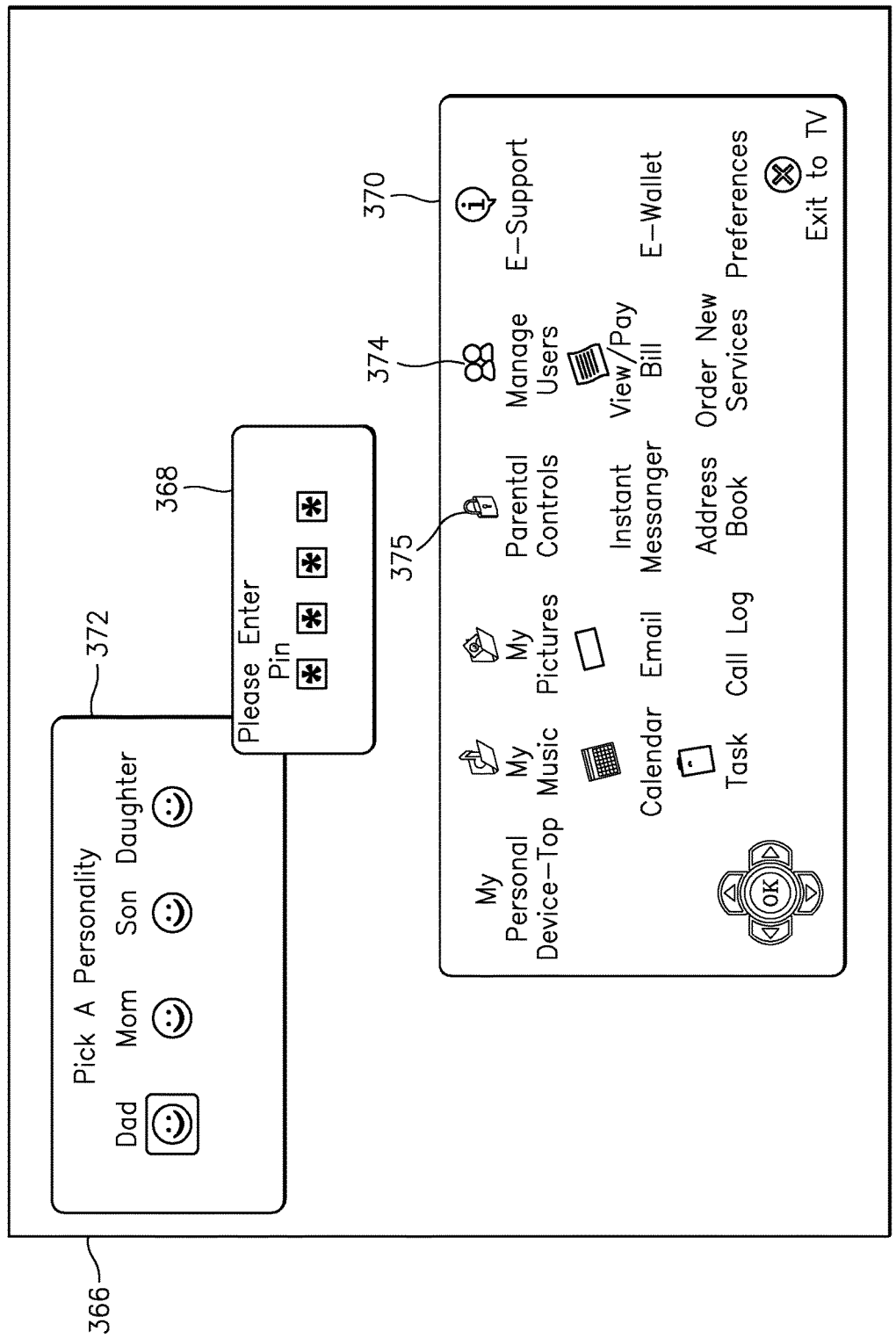
FIG. 6 is a user interface screen depicting a main menu for use in implementing the customized content services in exemplary embodiments.

As indicated above, a registered user may establish a personalized electronic programming guide via the customized content services 106. In addition, a user with maximum defined access control privileges (e.g., head of household, parent, etc.) as configured via the custom content application 306, may manage other users established in the account. Turning now to FIG. 5, a process for implementing the customized content services 106 will now be described in exemplary embodiments. The process begins at step 350, whereby a user requests access to the customized content services 106 via host system 202A. The custom content application 306 presents a user interface screen with options to the user via, e.g., a display screen on the communications device 214B. Alternatively, the user may access a web site of the host system 202A via one or more of the communications devices 214A-214B associated with the community having a web browser (e.g., via communications device 214A) in order to create the personalized electronic programming guide. A sample user interface screen is shown in FIG. 6. The user interface screen 366 of FIG. 6 includes a 'sign in' or authentication window 368.

The user is prompted to enter a user name (not shown) and password (e.g., if logging in via a personal computer) or a PIN (e.g., if logging in via an IPTV device, such as communications device 214B). Once entered and validated, the custom content application 306 assigns the user's credentials (e.g., PIN and/or user name and password) to the account in database 210A. The user interface screen 366 also includes a personal device desktop window 370 (referred to below as a personal device top) including options for customizing content as described herein. In addition to associating a user identification with an account, the custom content application 306 further provides the ability to define a user by a role, or a relationship of the user among other users in the account. As shown in the user interface screen 366, a window 372 provides 'personality' selections based upon roles. The roles may be used by the custom content application 306 to define access control capabilities for each of the users in the account. For example, the roles "Dad" and "Mom" may be given maximum access control capabilities for managing user activities for other roles associated with the account (e.g., "Son", "Daughter").

Figure 7:
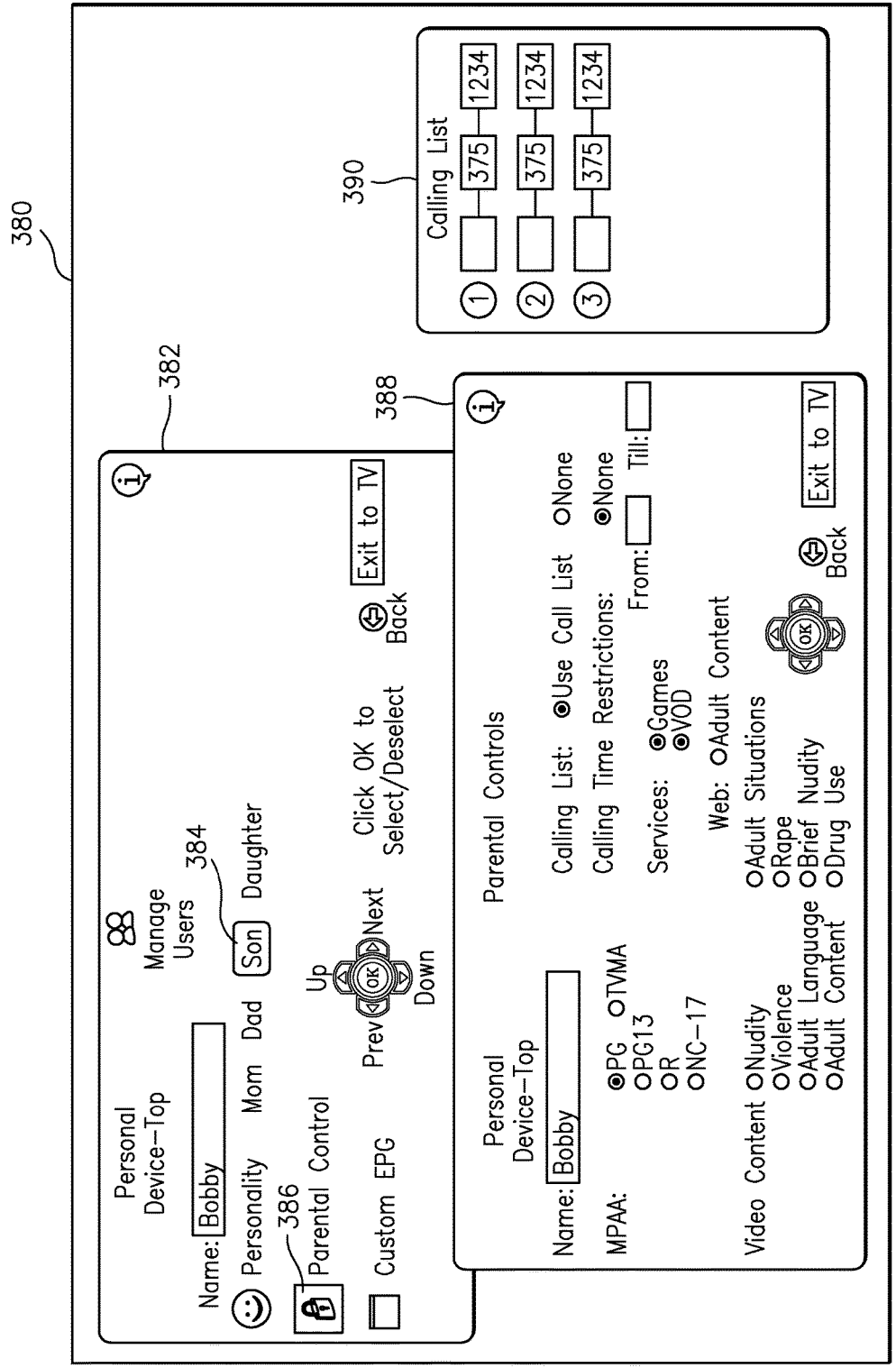
FIG. 7 is a user interface screen including options for managing users of the customized content services in exemplary embodiments.

If a user with maximum access control capabilities selects the "Manage Users" option on personal device-top window 370, a new user interface screen 380 is presented as shown in FIG. 7. User interface screen 380 may include a window 382 for managing users. According to an exemplary embodiment, the user with maximum defined access controls enters the name of a user for which controls are desired and may select a personality, or role, of the user, in this case, "Son" 384. The user then selects parental controls 386 to define the restrictions to content and services as shown in the window 388 of FIG. 7. Alternatively, if the user has already been defined for the account (e.g., a personality has already been selected), the user with maximum defined access controls may instead select "Parental Controls" 375 directly from the window 370 of FIG. 6.

Returning to FIG. 7, a variety of access restrictions may be placed on a user via the parental controls feature. For example, restrictions regarding content ratings, content situations, Web content, services such as games and video on demand, in addition to calling restrictions may be placed on a user via the parental control feature. These calling restrictions may be based upon destination calling numbers (e.g., via calling list window 390), by time ranges, or a combination of the above.

Figure 8:
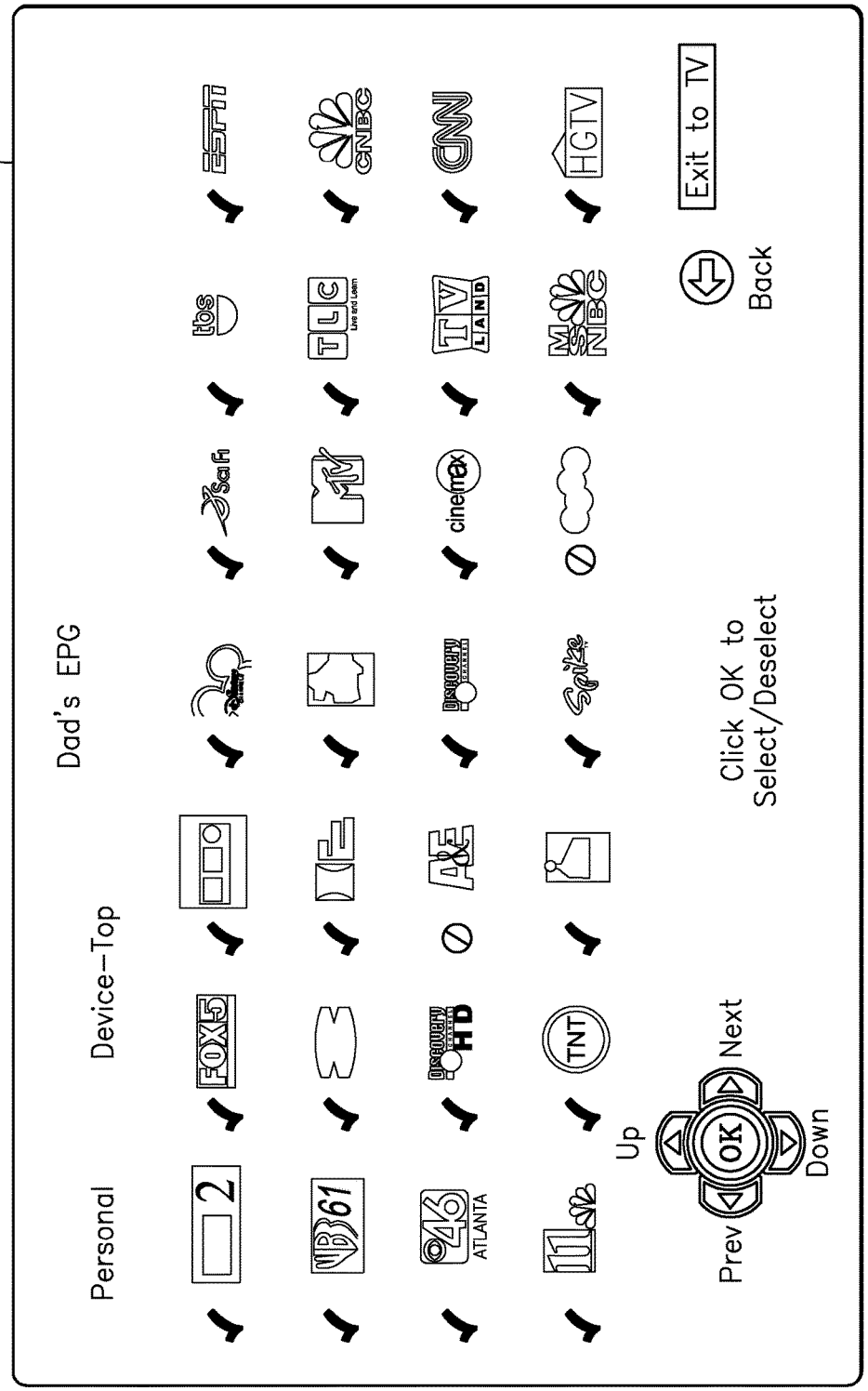
FIG. 8 is a user interface screen depicting a sample personalized electronic programming guide created via the customized content services in exemplary embodiments.

Returning now to FIG. 5, a process for creating a personalized electronic programming guide will be continued. At step 354, the custom content application 306 presents a listing of programming content sources for selection. These content sources may include broadcast content, IP-based content, premium channel content, etc. A user interface screen depicting a sample customized EPG is shown in FIG. 8. The user has selected the content sources listed in the user interface screen 392 of FIG. 8. The custom content application 306 assigns these preferences to the user's account at step 354. In addition, if a role has been selected by the user (e.g., "Dad"), this role may be assigned to the user's account as well at step 356.

The custom content application 306 creates a profile that includes these preferences (and role, if selected) and stores the profile in database 210A of FIG. 4. A personalized electronic programming guide is created for the user at step 360. The personalized electronic programming guide (EPG) is used by the host system 202A in determining which channels will be presented to the communications device 214. In this manner, the user is able to bypass those channels in which he/she has no interest.

At step 362, it is determined whether another request for an electronic programming guide is received. If so, the process returns to step 352. Otherwise, the process ends at step 364. The custom content application 306 may utilize user credentials (e.g., PIN and/or user name and password) and device identifiers (e.g., GUID, MAC address, etc.) provided in the account as described in FIGS. 2 and 3 to direct the customized content to the device currently operated by the user. In this manner, the user may access customized content via his/her EPG at any device identified in the account.

The features provided by the personal device-top window 370 of FIG. 6 may include purchasing items that are advertised or presented on the display screen of the communications device via an e-wallet component. A user may be prompted to select an item for purchase whereby the e-wallet feature is initiated. In exemplary embodiments, the e-wallet feature incorporates bank account information (e.g., credit card data, routing numbers, etc.) for an account and routes the purchase data (e.g., purchase price, date, seller information) to a destination based upon the bank account information. This bank account information may be stored in the user's account and accessed at any time a purchase is desired.

A sample account record for a community of users may include the following information fields whereby one or more fields are mapped to one or more others of these fields: ACCT ID, USER/ENTITY, ROLE_MAX, ROLE_SUB, DEVICE_ID, ENTITY_ADDRESS, CREDENTIALS. The ACCT ID may identify the group of users assigned to the account (e.g., family members in a household). The USER/ENTITY may identify each individual user in the group and may include assigned devices for the account (e.g., LIVINGROOM_TV). The ROLE_MAX field may reference those users with maximum privileges (e.g., "Dad"), while ROLE_SUB field may reference subordinate privileges (e.g., "Son"). The CREDENTIALS fields may store a list of the user's sign on information, such as user name, password, PIN, etc.

Likewise, a profile may include some of the account information described above, and may include each user's individual preferences. For example, a profile for "Dad" may include personally selected television stations (e.g., sports channels, premium channels, etc), as well as permissions granted to subordinate users (e.g., users identified in the ROLE_SUB field of the account record), etc.

Once the profiles have been established for each account, information associated with the profiles and custom EPGs may be used to provide targeted advertising services to commercial advertising entities. Using information provided in the user profiles and accounts stored in database 210A, as well as other sources of information, the targeted advertising services 108 enable a service provider, such as host system 202 to more particularly define a target market to which advertisements may be transmitted. In addition, the targeted advertising services 108 provide the host system 202 with the ability to capture detailed viewing information with respect to users defined in the accounts and provide useful reporting information to these advertisers. These features are described further herein.

Figure 9:
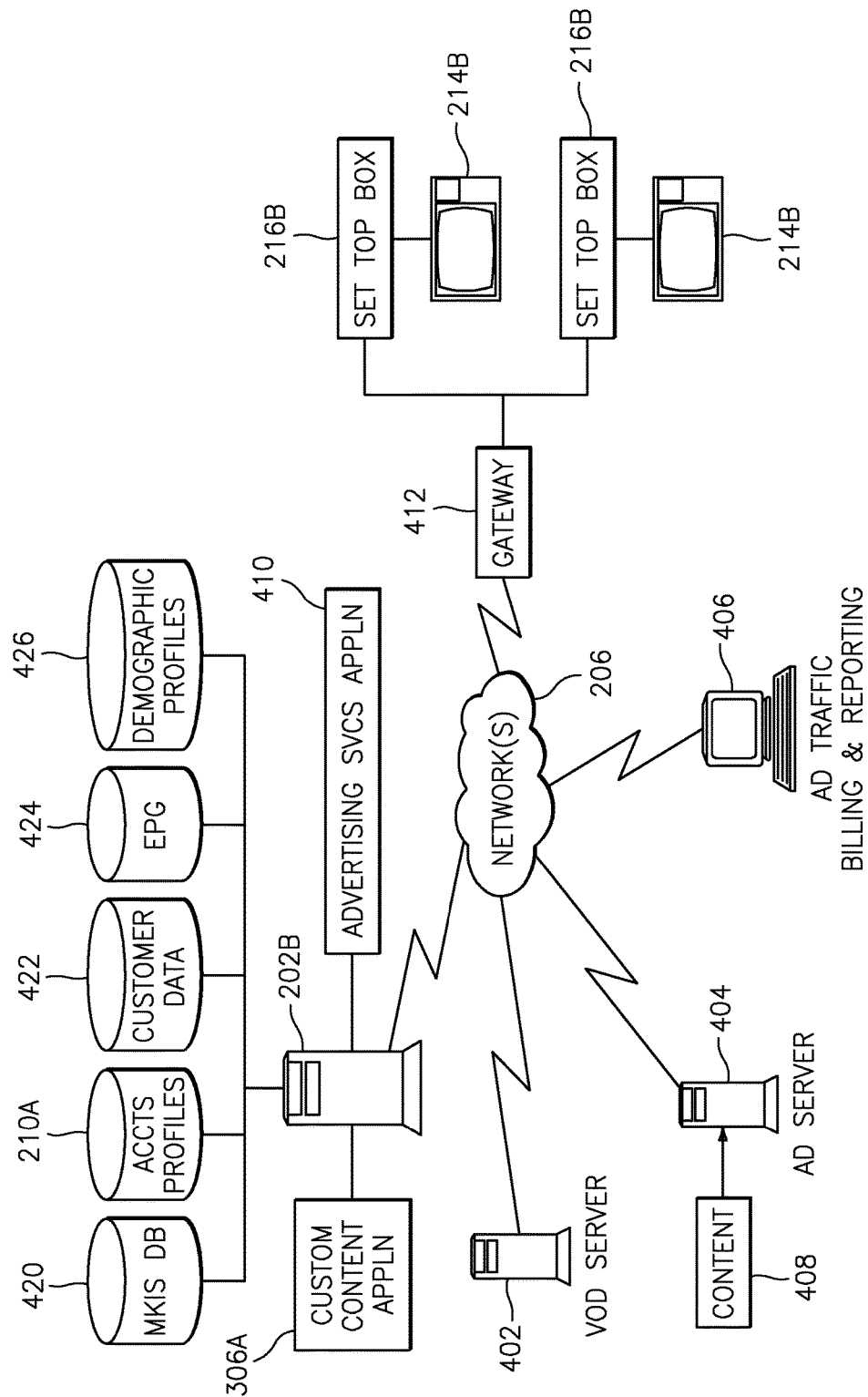
FIG. 9 is a block diagram of a portion of the network convergence infrastructure for implementing targeted advertising services in exemplary embodiments.
Figure 11:
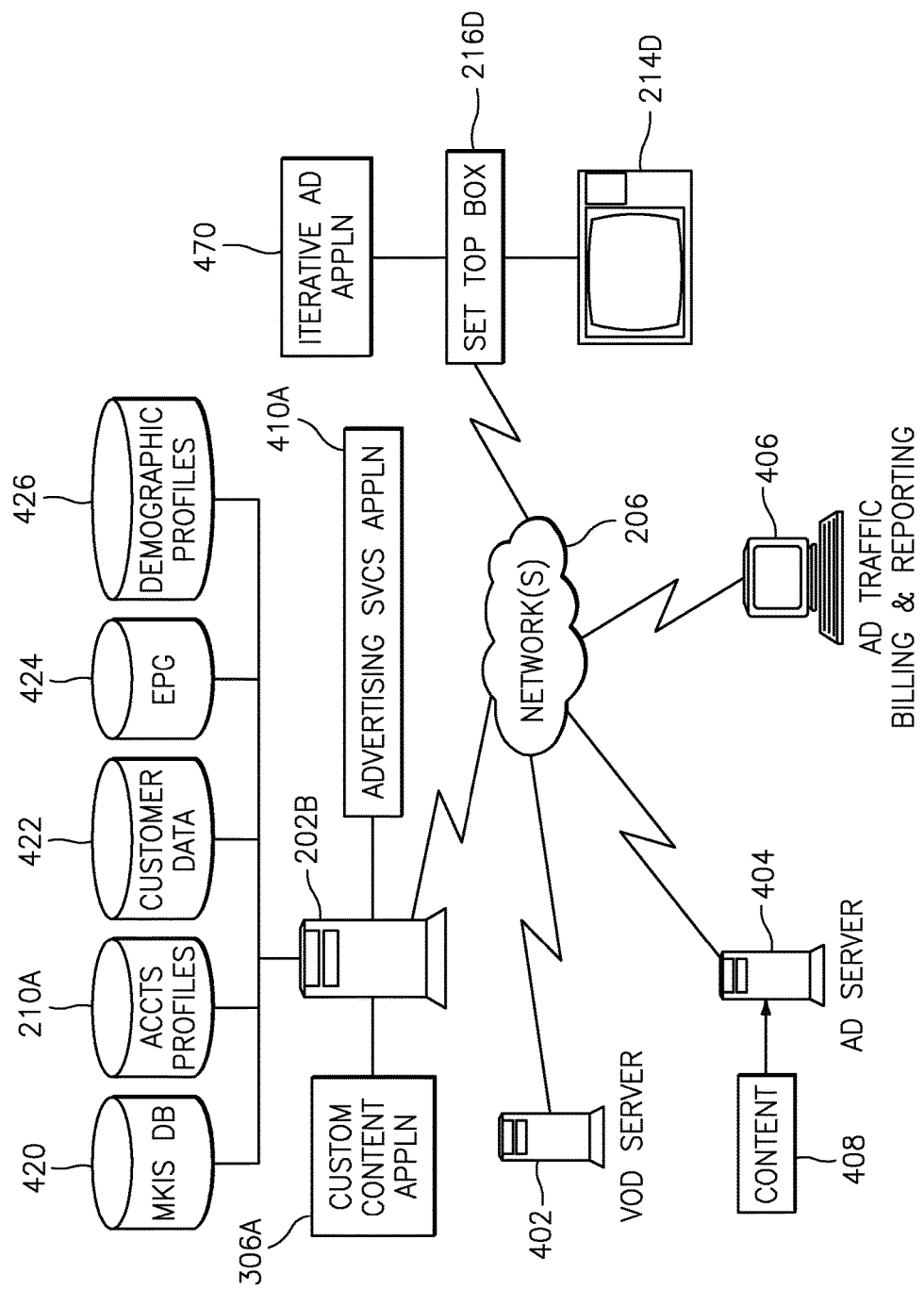
FIG. 11 is a block diagram of a portion of the network convergence infrastructure for implementing targeted advertising services in alternative exemplary embodiments.

Turning now to FIGS. 9 and 11, block diagrams illustrating a portion of the network convergence infrastructure 102 for implementing targeted advertising services 108 will now be described in exemplary embodiments. The system of FIGS. 9 and 11 include elements similar to those described in FIGS. 2 and 4. To this extent, these elements will not be further described. The system of FIG. 9 includes a host system 202B in communication with a video-on-demand (VOD) server 402; an ad server 404; an ad traffic, billing and reporting system 406; and communications devices 214B. Video-on-demand server 402 provides content programming that is distributed to communications devices (e.g., communications devices 214B) upon request. For example, content provided by VOD server 402 may include programming that is ordered and charged to the user on a per-viewing basis (e.g., Pay-per-view). In this embodiment, VOD server 404 may be located in a video head end (VHO) office that handles content distribution for a large geographic region. Alternatively, the content provided by VOD server 402 may be localized content (e.g., video serving office (VSO), or central office (CO), etc.) that provides content that is specific to the region in which the communications devices 214B reside. In further embodiments, the content provided by VOD server 402 may be personal videos of users of communications devices 214B, whereby VOD server 402 provides network storage of the content for the users. The content may be distributed to other communications devices 214B upon request of the owner (e.g., users of communications devices 214B).

Ad server 404 receives content 408 from a content source, e.g., content server 302 of FIG. 4. The ad server 404 includes logic for inserting advertisements into the content data stream that is distributed over networks 206 to communications devices, such as communications devices 214B. Ad server 404 may be implemented by the service provider of host system 202B. The ad server 404 utilizes an electronic programming guide (e.g., EPG 424) to determine the appropriate time and location of a program within which to insert the advertisement. The EPG 424 may include a schedule of programming including beginning and end times.

Ad traffic, billing and reporting system 406 receives results of activities conducted via the targeted advertising services 108 and generates reports for advertisers as will be described further herein. Ad traffic, billing and reporting system 406 may be implemented using a general-purpose computer processing device.

Host system 202B executes an advertising services application 410 for implementing the targeted advertising services 108 described herein. Advertising services application 410 may interface with custom content application 306A as needed. Host system 202B may also implement an application for collecting content stream data as will be described herein. This content stream collection application may be implemented using a channel monitoring process, such as the process and system disclosed in U.S. Pat. No. 6,718,551, as well as U.S. patent application Ser. Nos. 08/779,306, 11/186,163, 10/036,677, 11/212,369, 10/017,111, 11/212,350, 10/017,640, 10/036,923, 10/029,173, 10/034,654, 10/735,309, 10/735,346, the entire contents of all these documents are incorporated herein by reference.

Communications devices 214B receive distributed content from VOD server 402 and/or ad server 404 via networks 206, gateway 412, and set top boxes 216B as described herein.

As indicated above, the targeted advertising services 108 utilize information provided in the user profiles and accounts stored in database 210A, as well as other sources of information to enable a service provider, such as host system 202B to more particularly define a target market to which advertisements may be transmitted. Other information may come from a variety of sources. For example, past viewing activities may be gathered over time and stored in a marketing database (e.g., MKIS database 420) as described herein. In addition, account information and profiles stored in database 210A may be used. Profile information provides information that may be useful in determining a target market for advertising placement, e.g., role, gender, age group, personalized electronic programming guides, etc. provide significant information about a particular content viewer. Other information may be derived from external sources, such as credit information (e.g., FICA scores), viewer address, account service package, residence, income range, etc. This information is captured and stored in customer database 422.

The advertising services application 410 may utilize each of these information sources to generate demographic profiles for account holders and users. A demographic profile, e.g., may specify a gender, income range, family structure (e.g., dual income, no children), credit worthiness, age range, residential area, etc. In addition, the profile information stored in database 210A and the personalized electronic programming guides enable the advertising services application 410 to capture even greater details, such as the types of programming content the viewer has interest in (e.g., personal preferences or interests), as well as the viewing habits (e.g., particular time of day, number of hours, etc. a viewer is watching television). This information may be facilitated e.g., using the single sign on feature that identifies both the user and device. As indicated above, this information may be captured in MKIS database 420 over time to determine the viewing habits and preferences of the viewer.

Video on demand (VOD) server 402 may be a source of content whereby a user requests a particular program or content selection for viewing and/or recording. The content may be stored at the VOD server 402 and streamed to the viewer's device (e.g., one or both of devices 214B) upon request. The viewer may perform a variety of functions with respect to the content, e.g., fast-forward through portions, rewind, or pause portions, etc., via control options at the viewer's location (e.g., remote control device or device selections). These activities, e.g., requesting the content, moving forward or backward through the content presentation, pausing, terminating the stream, etc., may also be captured, e.g., via the channel monitoring activities described above. In this manner, the viewer's behavior may be monitored and utilized by the targeted advertising services 108 in determining what types of advertising may be transmitted.

Figure 10:
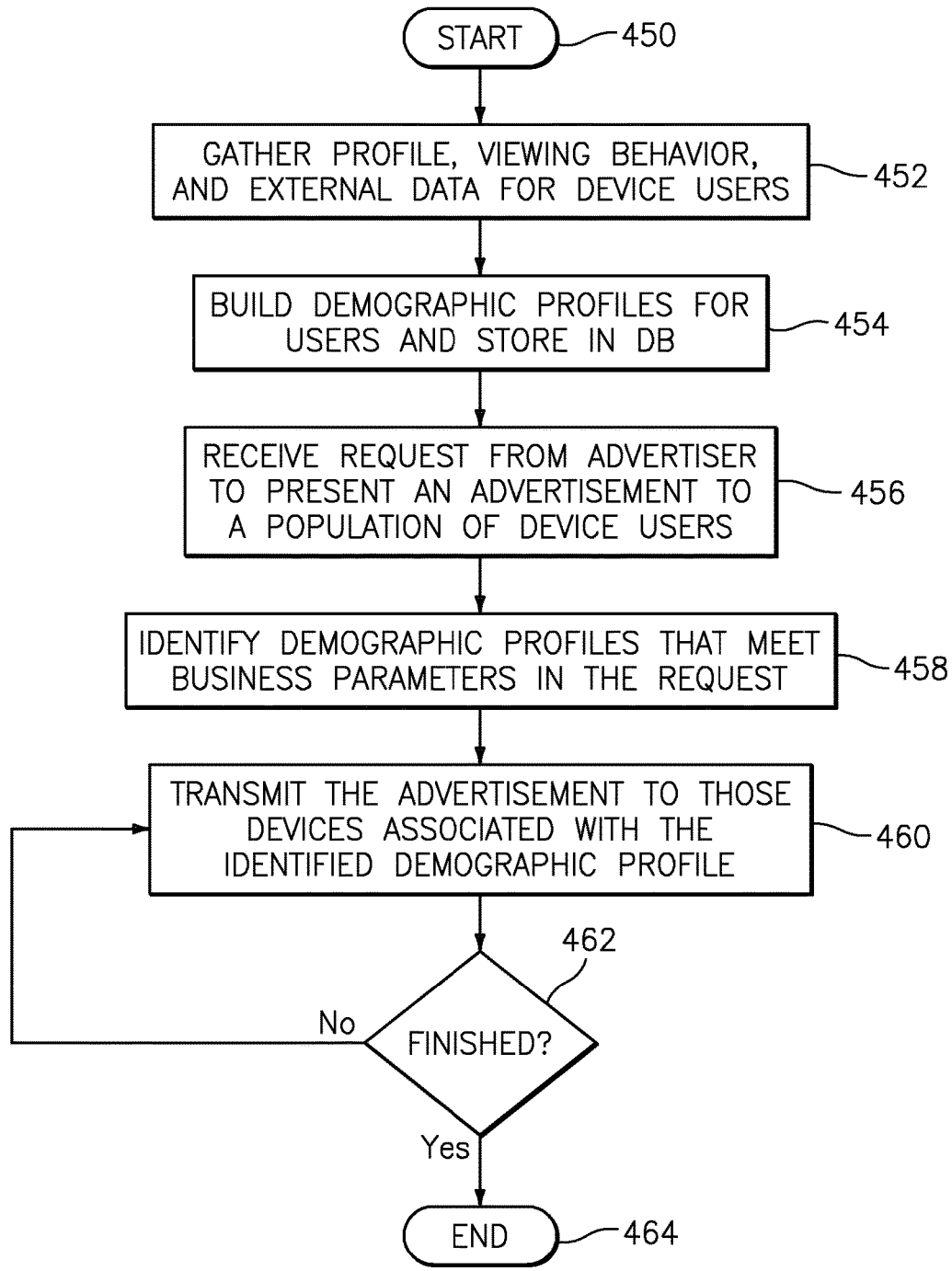
FIG. 10 is a flow diagram describing a process for implementing the targeted advertising services in exemplary embodiments.

Turning now to FIG. 10, a flow diagram describing a process for implementing the targeted advertising services 108 in exemplary embodiments will now be described. The process begins at step 450 whereby the advertising services application 410 gathers profile information, past viewing behaviors, and external data for its viewing audience at step 452. As indicated above, this information may be gathered from and/or stored in databases 420, 210A, 422, and 426. The advertising services application 410 builds demographic profiles for users based upon the gathered information and stores the demographic profiles in database 426 at step 454.

At step 456, the host system 202B receives a request from an advertiser to present an advertisement to a population of the viewing audience (e.g., device users). The advertiser provides a set of business parameters for establishing the target audience, timing of the advertisement, and program placement, to name a few.

At step 458, the advertising services application 410 searches demographic profiles database 426 to identify those demographic profiles that satisfy the criteria provided in the business parameters (e.g., target a cereal advertisement to males between the ages of 6 and 10). The EPG guide database 424 may be searched in order to determine the program placement for the advertisement if specified by the advertiser. Once the demographic profile is identified, the advertising services application 410 identifies those users (e.g., via profiles, personalized EPGs, etc.) that meet the demographic profile.

At step 460, the advertisement is assigned by the ad server 404 for distribution to the targeted audience (e.g., users identified in demographic profile) and the advertisement is transmitted to corresponding communications devices 214. At step 462, it is determined whether there are any further advertisements in need of distribution (e.g., where the business parameters specify that the advertisement must be distributed a specific number of times or over a specified time range). If there are additional advertisements, the process returns to step 460. Otherwise, the process ends at step 464.

As indicated above, the results of the distribution of advertisements may be used to generate reports for advertisers, as well as for billing purposes. The advertisement distribution data may be captured by host system 202B, e.g., via ad server 404 and networks 206 and transmitted to the ad traffic, billing and reporting system 406 for report generation and transmission. In addition, the data captured by the targeted advertising services may be used to develop and implement a business model for generating revenue. For example, the targeted advertising services provide the capability to capture and synthesize the detailed activities of viewers. This information may be used to provide advertisers with useful information about the particular demographics surrounding potential or actual purchasers of products sold by the advertisers. Suppose, for example, that an advertiser sells MP3 players. The targeted audience selected for receiving advertisements related to MP3 players may be monitored in order to determine how successful the advertisement is. It may be that the anticipated audience is not watching television at the time the advertisement is displayed (e.g., after 10 p.m. during the school year as compared to the summer months when older children are awake longer hours). It may also be that a renegade hit television show unexpectedly draws an audience of the desired, targeted age group. The actual (versus 'anticipated') viewing behaviors may be captured by the targeted advertising services and relayed to the relevant advertisers, such that modifications to the targeted viewing audience can be realized in near real time. In addition, the targeted advertising services may track the purchasing activities of the viewer (e.g., via the e-wallet feature) and may charge a premium for this information.

As indicated above, a channel monitoring application may be used to intermittently collect viewing behavior by users of communications devices 214B. The channel monitoring application may reside anywhere within the network convergence infrastructure 102, e.g., within networks 206, gateway 412, and set top boxes 216B, to name a few. The click stream data captured by the channel monitoring application provides information, such as whether a communications device 214B is currently active (e.g., user signed on to device) or whether a user of communications device 214B is currently viewing a program (e.g., via channel changes, volume adjustment, etc.). This information may be useful in determining whether a viewer actually perceived the advertisement that was presented (e.g., the user did not leave the room during the advertisement because the click stream data at the time indicates a volume adjustment). This click stream data may be gathered by the advertising services application 410 and used by the advertiser in establishing business parameters. For example, the advertiser may specify that a number of advertisements must be 'perceived' by viewers and not simply transmitted to the communications device. Reporting details regarding this parameter may be captured and presented to the advertiser in order to demonstrate compliance with the business parameter, as well as for billing purposes.

In further exemplary embodiments, the advertisement may be targeted to a specific device within a household. Depending upon the nature of the transmission (e.g., broadcast versus unicast), this may be accomplished using a variety of techniques. For example, if a program content is unicast, then the advertising services application 410 identifies those communications devices which have been activated by a viewer and which meets the demographic profile criteria (e.g., the viewer has signed on to LIVINGROOM_TV.PPPoE@domainaddress.non, where PPPoE is determined to be a viewer that fits the demographic profile). The advertising services application 410 presents the information to the ad server 404, which in turn, transmits the advertisement directly to the device address. In this manner, each IPTV device in a household may be presented with different advertisements while watching the same channel. In addition, if the user is viewing content from VOD server 402, the advertising services application 410 may direct the ad server 404 to transmit an advertisement at a designated time (e.g., immediately prior to displaying the content) to the viewer.

If the transmission is broadcast, the advertisement may be targeted to a specific communications device using a different technique, as described in FIG. 11. The system of FIG. 11 includes elements similar to those described in FIGS. 2, 4, and 9. To this extent, these elements will not be further described.

The system of FIG. 11 includes an iterative ad application 470 executing on a set top box 216D. Once the advertising services application 410A determines a communications device that meets the requirements set forth in the demographic profile described above in FIG. 9 and FIG. 10, the advertising services application 410 uses the EPG in database 424 to determine a schedule (e.g., timing and placement) of the advertisement for the device. The advertising services application 410A issues a request to the ad server 404 to upload advertisements to the set top box 216D of the communications device 214D at a given time (e.g., off-peak times). At the given time, the advertisements and schedule are distributed over networks 206 to the set top box 216D. The iterative ad application 470 includes logic for ensuring that the advertisements are presented according to the schedule. In addition, the iterative ad application 470 may include the click stream functionality in order to determine whether the advertisement was successfully viewed by the user of communications device 214D. This information may then be transmitted to host system 202B for further processing as described above.

In yet further embodiments, the targeted advertising services 108 may enable host system 202B to track purchases conducted via the e-wallet feature provided by the consolidated system services 106-118. The e-wallet feature may be accessed directly (e.g., via personal device-top window 370 of FIG. 6), or may be accessed by selecting a function on a remote control device for the communications device 214 when prompted on the display screen. The host system 202B may identify purchases made by users of communications devices and may further collect other information about the purchases (e.g., user role, advertisement identifier and time of order, etc.).

Figure 12:
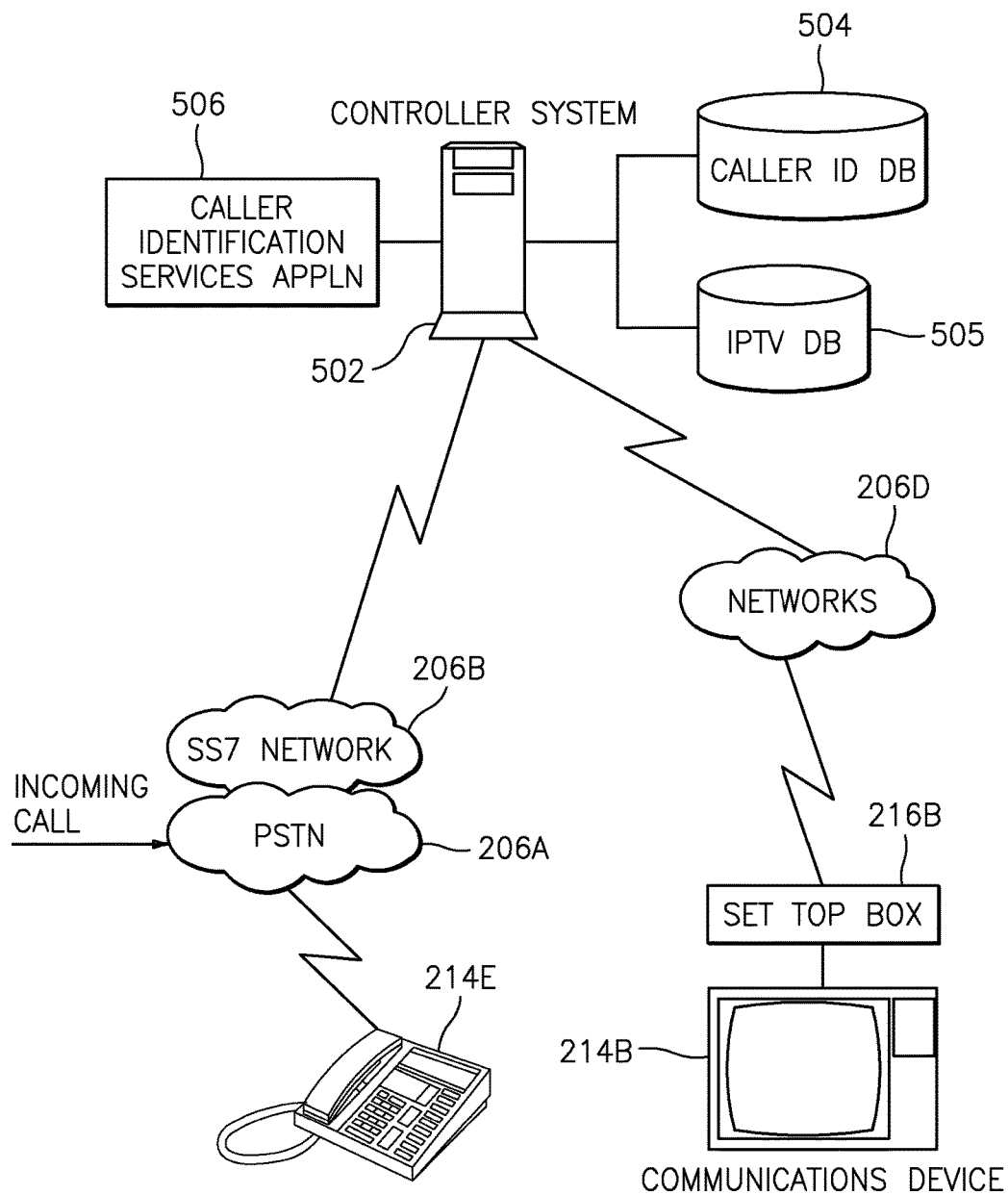
FIG. 12 is a block diagram of a portion of the network convergence infrastructure for implementing IPTV caller identification services for calls terminating at a wireline communications device using a termination attempt trigger in exemplary embodiments.
Figure 14:
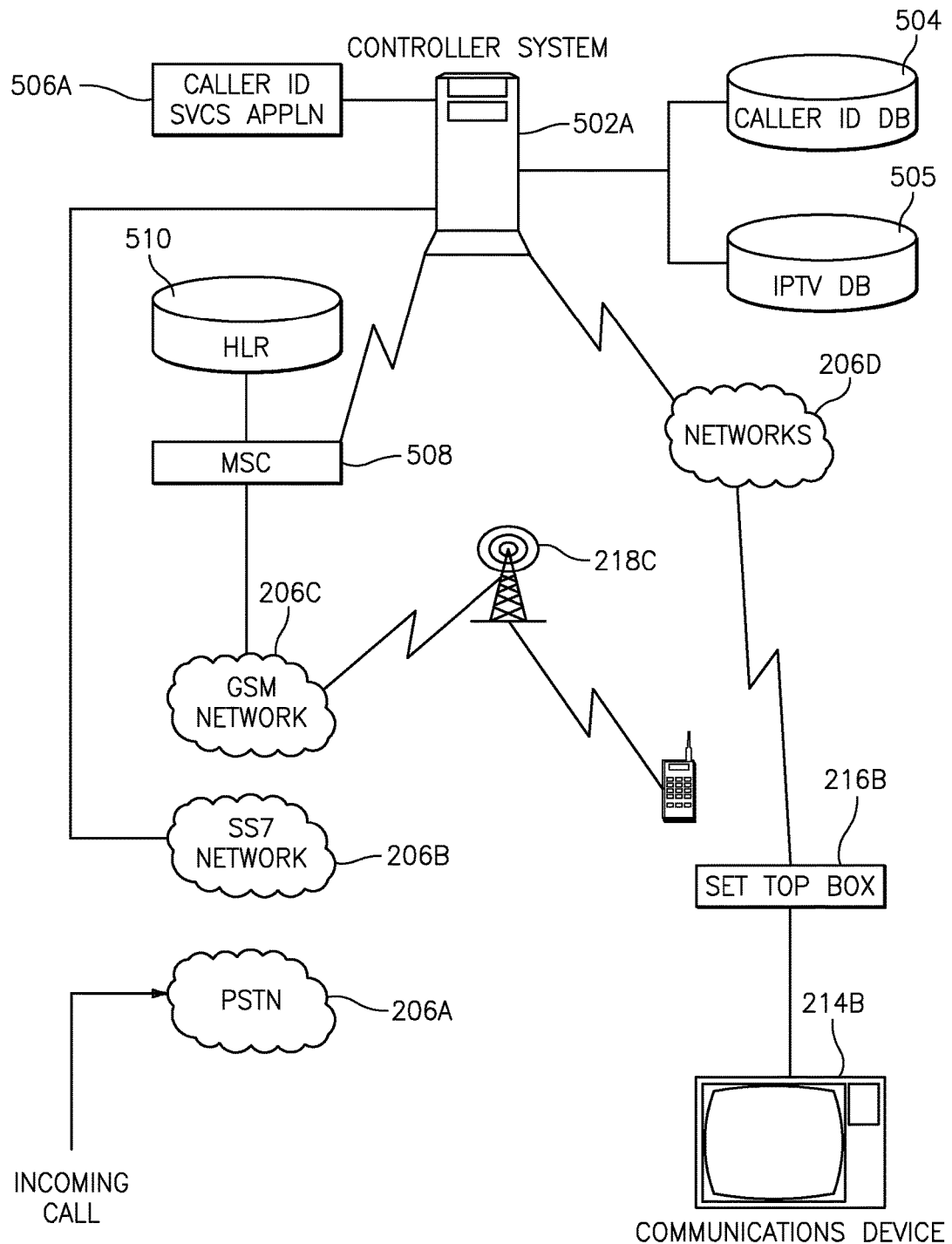
FIG. 14 is a block diagram of a portion of the network convergence infrastructure for implementing IPTV caller identification services for calls terminating at a wireless mobile communications device using a termination attempt trigger in exemplary embodiments.
Figure 15:
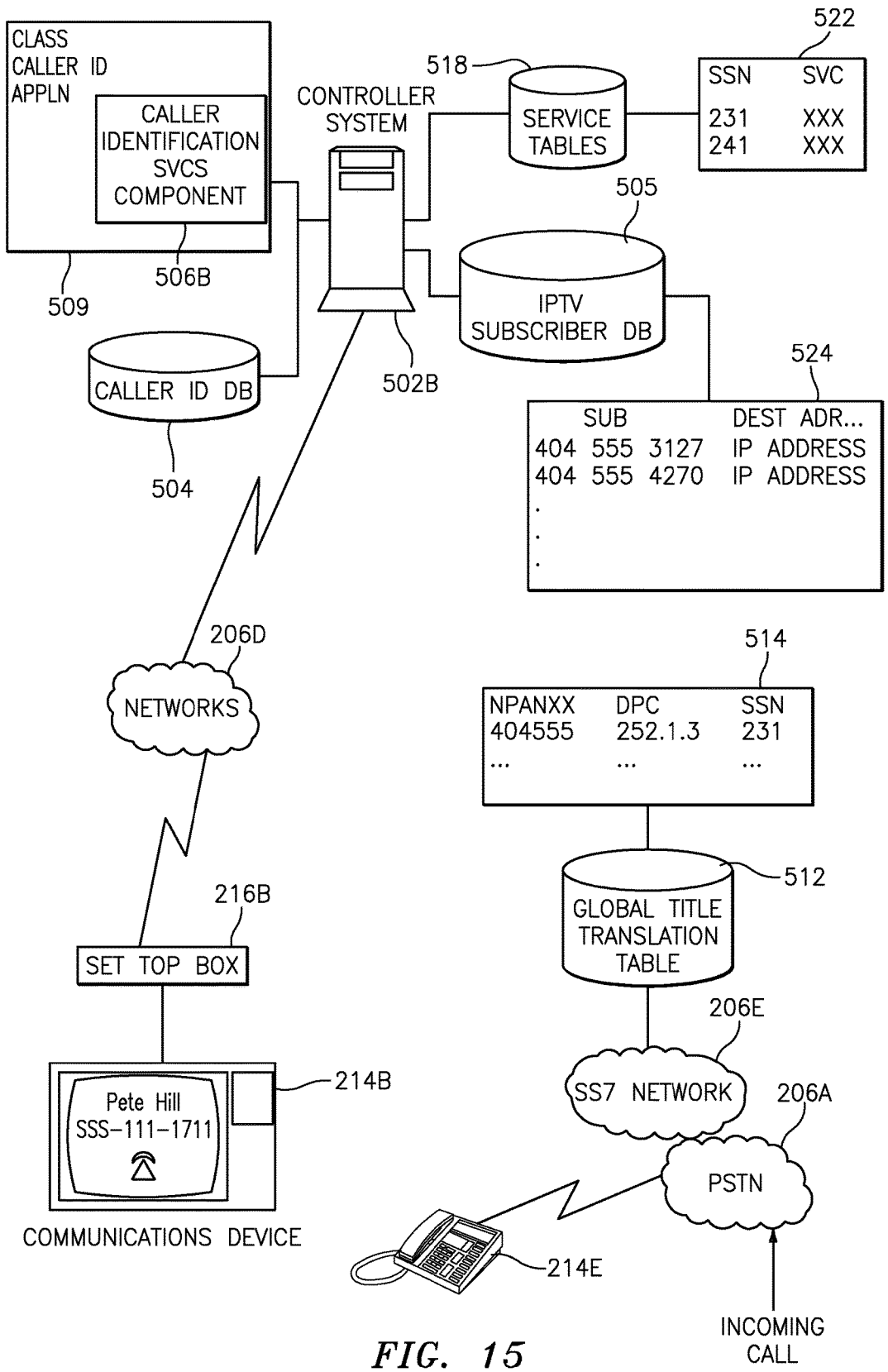
FIG. 15 is a block diagram of a portion of the network convergence infrastructure for implementing IPTV caller identification services in alternative exemplary embodiments.

As indicated above, caller identification services 110 may be implemented via the network convergence infrastructure 102. The caller identification services 110 enable IPTV subscribers to view caller information directly on the IPTV device. The caller information is routed over various network elements depending upon the caller and calling device network configuration. FIG. 12 illustrates a system embodiment for calls terminating at a wireline communications device. FIG. 14 illustrates a system embodiment for calls terminating at a wireless mobile communications device. Each of the system embodiments described in FIGS. 12 and 14 are implemented using a termination attempt trigger or similar triggering event as will be described further herein. FIG. 15 illustrates a system embodiment for implementing the caller identification services without the termination attempt trigger. FIG. 15 also illustrates an example of the caller information as it may be displayed on a device. Alternatively, or additionally, the caller party information may be rendered as an audible announcement delivered over the IPTV audio system.

Turning now to FIG. 12, a block diagram of a portion of the network convergence infrastructure 102 for implementing the caller identification services 110 for calls terminating at a wireline communications device will now be described in exemplary embodiments. The system of FIG. 12 includes elements similar to those described in FIGS. 2, 4, 9, and 11. To this extent, these elements will not be further described.

For ease of illustration, the system of FIG. 12 depicts a simplified network infrastructure. It will be understood that a variety of network components/nodes may be utilized in implementing the embodiment described herein. The system of FIG. 12 includes a controller system (e.g., service control point (SCP) server or application server) 502 in communication with a communications device 214E over one or more networks 206A and 206B. Controller system 502 may also communicate with networks 206D. Communications device 214E may be a wireline telephone associated with the account also servicing the communications device 214B (e.g., both devices are within the community of a single account or household and may be co-located at a single customer premises).

Public switched telephone network (PSTN) 206A may include central office switches (not shown), which in turn may include service switching point (SSP) functionality (not shown). The switches originate and/or terminate calls and communicate over the SS7 network 206B with controller system 502 and a caller identification name database (e.g., CNAM database) 504 to determine how to route a call, or set up and manage a call feature such as the caller identification services 110. Caller identification database 504 may include a table of telephony user information (e.g., subscriber names and numbers) and maps the names to the caller party numbers received at the controller system 502. Controller system 502 is also in communication with an IPTV database 505. IPTV database 505 may store account information for subscribers of the caller identification services 110 (e.g., users of communications devices 214E and 214B). In alternate exemplary embodiments, the caller and/or the called party may be served by an IMS-based telecommunications network that is capable of responding to triggering events, and is in communication with a CNAM database by SS7 or IP connectivity.

In exemplary embodiments, IPTV database 505 contains IPTV addresses for IPTV-enabled communications devices (e.g., communications device 214B), each of which are mapped to another communications device address (e.g., telephone number assigned to a user of communications device 214E). The addresses for these devices are mapped to one another, such that caller identification information for a call that is directed to a first communications device via a voice network (e.g., communications device 214E) is transmitted to, and presented on, an IPTV-enabled communications device (e.g., communications device 214B) over a data network (e.g., networks 206D). Controller system 502 executes an application for implementing these services, referred to herein as caller identification services application 506. Caller identification services application 506 may be a service package application (SPA). Service package applications facilitate various communications features, such as caller identification services and call blocking. SPAs may be initiated as a result of a termination attempt triggering event as described herein.

SS7 network 206B may include various network elements, such as signal transfer points (STPs) (not shown), packet switches for routing call signaling traffic through the networks 206. The SS7 network 206B may transmit the call signals via reserved channels, or signaling links, that connect central offices of PSTN 206A (not shown) and other network elements.

Networks 206D may include an IP-based network that receives call information from controller system 502 and delivers the call information to set top box 216B and communications device 214B for display or other rendering on the communications device 214B.

The caller identification services 110 may utilize a termination trigger point that, upon detection, triggers the caller identification services application 506 to process the incoming call signal and is implemented by the caller identification services application 506 as described herein. The caller identification services application 506 may be implemented, e.g., as an advanced Intelligent Network (AIN) application and protocols, using SIP signaling, using a Java application utilizing data transmission protocols, such as XML and SOAP, or a combination of these or other program implementation. When a telephone call is placed by a calling party (e.g., shown as incoming call to PSTN 206A), the calling signal is transmitted as described herein.

Figure 13:
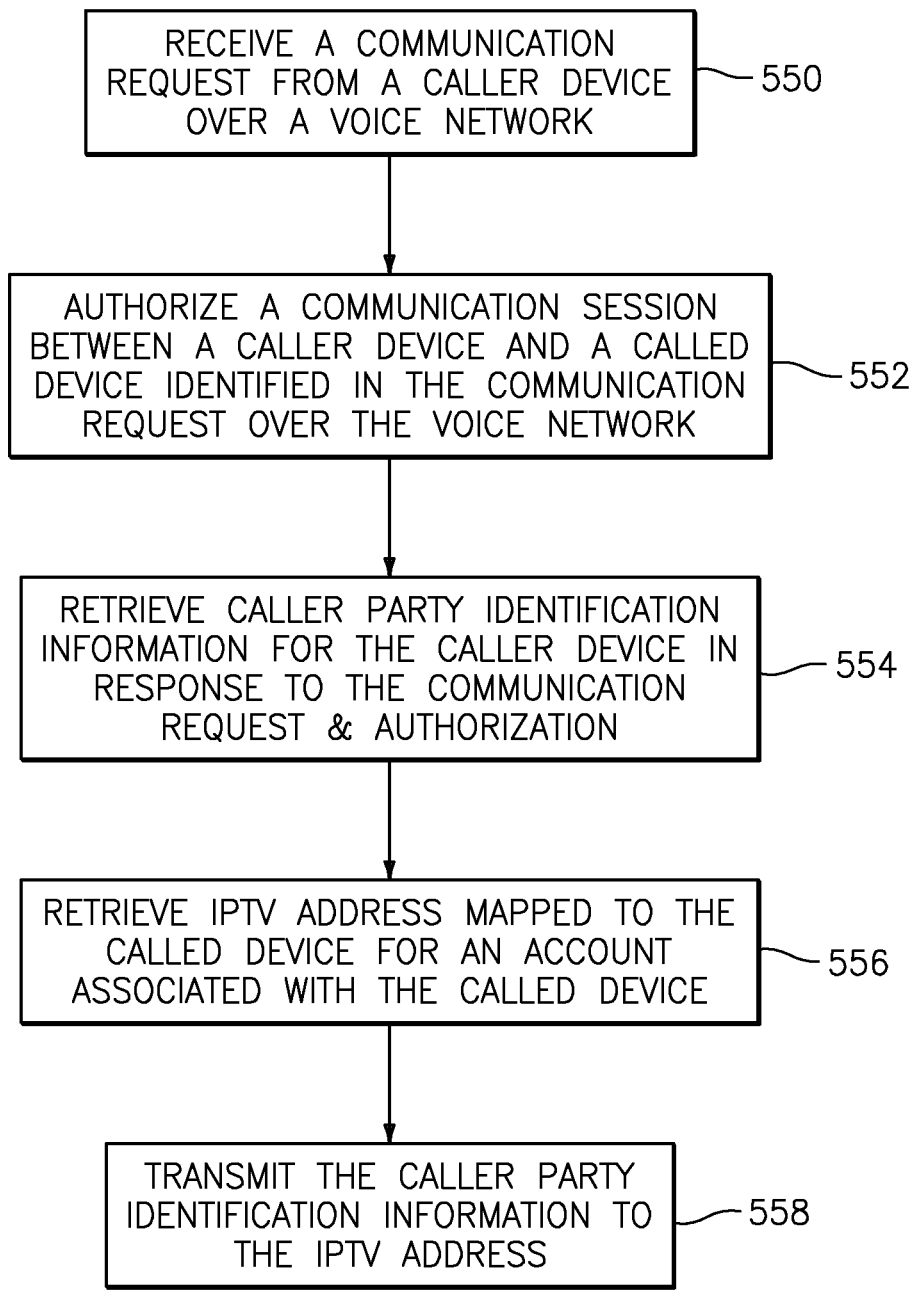
FIG. 13 is a flow diagram describing a process for implementing the IPTV caller identification services for calls terminating at a wireline communications device using a termination attempt trigger in exemplary embodiments.

Turning now to FIG. 13, a flow diagram describing a process for implementing the caller identification services 110 for calls terminating at a wireline communications device (e.g., PSTN-enabled device) over a voice network will now be described in exemplary embodiments.

A communication is initiated by a caller communications device over a voice network (e.g., PSTN 206A). A central office switch or SSP of PSTN 206A receives the communication (e.g., communication signaling), resulting in a termination attempt trigger. The trigger causes a communication request to proceed over SS7 network 206B via, e.g., a signal transfer point (STP). At step 550, the communication request is received at the controller system 502. The communication request includes call-related information, e.g., called party number (e.g., a number assigned with communications device 214E) and caller party number. The caller identification services application 506 authorizes a communication session between the called party device and the caller party device via a return reply (e.g., termination authorization signal) over the signaling network (e.g., SS7 network 206B). At the same time, caller identification database 504 is searched for caller party identification information (e.g., caller name).

At step 554, the caller party identification information is retrieved from database 504. The caller identification services application 506 searches IPTV database 505 for the called party number. The called party number may be used to map communications address information for devices, such as communications devices 214E and 214B. An IPTV address mapped to the called party number is retrieved at step 556. The IPTV address may be a uniform resource locator (URL), Internet address, or other type of address. At step 558, the caller party identification information is transmitted over a data network (e.g., networks 206D) to the IPTV-enabled communications device assigned to the IPTV address (e.g., communications device 214B). The caller party identification information may be transmitted to the set top box 216B of the IPTV-enabled communications device 214B using, e.g., UDP/HTTP protocols, where it is displayed or otherwise rendered on the IPTV device. It will be understood that database 505 may include information specifying which of several IPTV set top boxes have requested to receive caller information, and which have not.

The caller identification services 110 described above may be modified or adapted to varying communication networks. Turning now to FIG. 14, a system for implementing the caller identification services for calls terminating at a wireless mobile communications device will now be described in exemplary embodiments. The system of FIG. 14 includes elements similar to those described above in FIGS. 2, 4, 9, 11, and 12. To this extent, these elements will not be further described. As shown in FIG. 14, a subscriber of the caller identification services 110 communicates via communications device 214C, which may be a wireless mobile telephone operating over a cellular network.

An incoming call to communications device 214C (communications request) proceeds through PSTN 206A, SS7 network 206B, and on to GSM (Global System for Mobile Communications) network 206C. The communication request is routed by the GSM 206C to a mobile switching center (MSC) 508, which is responsible for routing incoming and outgoing calls within its own network or to and from a wireline network (e.g., PSTN 206A) or to and from other wireless networks.

The MSC 508 queries a home location register (HLR) 510, which provides the administrative information required to authenticate, register and locate the called communications device 214C. Once authenticated, registered, and located, the MSC 508 transmits the communications request to controller system 502A. This communications request may result from, e.g., a Wireless Intelligent Network (WIN) trigger, a Customized Applications for Mobile Network Enhanced Logic (CAMEL) trigger, or other triggering event such as used in an IMS-based network. The caller identification services application 506A authorizes the communication via a message transmitted back to the MSC 508 whereby the MSC 508 terminates the call via GSM network 206C and a wireless base station 218C. At the same time the call is being delivered, the caller identification services application 506A searches caller identification database 504 for caller party identification information (e.g., caller name). The caller identification services application 506A searches IPTV database 505 for the called party number, which may be used to map communications address information for devices, such as communications devices 214C and 214B. An IPTV address mapped to the called party number is retrieved and the caller party identification information is transmitted over a data network (e.g., networks 206D) to the IPTV-enabled communications device assigned to the IPTV address (e.g., communications device 214B). It will be understood that the caller identification services 110 described above in FIG. 14 may be easily modified to accommodate other types of wireless communications devices, e.g., a dual- or multi-mode communications device using, e.g., an IEEE 802 wireless LAN or other wireless network.

Turning now to FIG. 15, a block diagram of a portion of the network convergence infrastructure for implementing IPTV caller identification services 110 in alternative exemplary embodiments will now be described. The embodiments described in FIGS. 12 and 14 utilize a termination attempt trigger for initiating the caller identification services 110. However, a termination attempt trigger implementation may have certain limitations in some network implementations that limit its usefulness in this application. The system described in FIG. 15 provides an alternative means for implementing the caller identification services.

An incoming call is received at the PSTN 206A. A Custom Local Area Signaling Service (CLASS) feature in the receiving central office switch of PSTN 206A initiates a query, e.g., a TR-1188 message, for caller party identification information. The central office switch is typically not required to know which controller system is responsible for managing the caller party identification information. The query is transmitted to a signal transfer point (STP) via the SS7 network 206E. The STP accesses a global title translation table database 512 in order to determine the appropriate controller system to send the request. Translation tables 514 include a numbering plan area and exchange field (NPA-NXX), a destination point code (DPC) field and a subsystem number (SSN) field. The NPA-NXX field corresponds to calling numbers for subscribers. The DPC field refers to a destination address for a controller system that handles a particular NPA-NXX. The subsystem number identifies the service that is being requested.

Once the controller system responsible for the caller party identification is determined, the request is forwarded to the controller system (e.g., controller system 502B). A CLASS caller identification application 509 executing on the controller system 502B determines which of its services are handled by the subsystem number. This may be implemented by accessing service table database 518. Service tables 522 stored therein include a subsystem number field (SSN) and service field (SVC). The service field identifies which service is invoked by a given subsystem number. In this case, the subsystem number relates to the service package application which provides the CLASS Caller ID service. However, the CLASS application 509 is modified to incorporate the IPTV caller identification services capability 110. The CLASS application 509 optionally performs normal Caller ID processing, returning the normal reply message, containing the caller name information, to the central office switch. Then the caller identification services component 506B, which has been added to the CLASS application, accesses IPTV database 505 and searches records 524 for the called party account (e.g., the account associated with communications device 214E. The records 524 provide a mapping of subscriber data to the IPTV-enabled devices (e.g., communications device 214B or set top box 216B) associated with the caller identification services 110 subscribers.

The caller identification services component 506B also searches caller identification database 504 in order to determine the caller party identification information (e.g., caller name). The caller party identification is transmitted over networks 206D to communications device 214B as previously described. As noted, the normal CLASS caller party identification information may be transmitted over SS7 network 206E and PSTN 206A to the called device (e.g., communications device 214E) in a manner similar to that described above in FIGS. 12 and 14.

Figure 16:
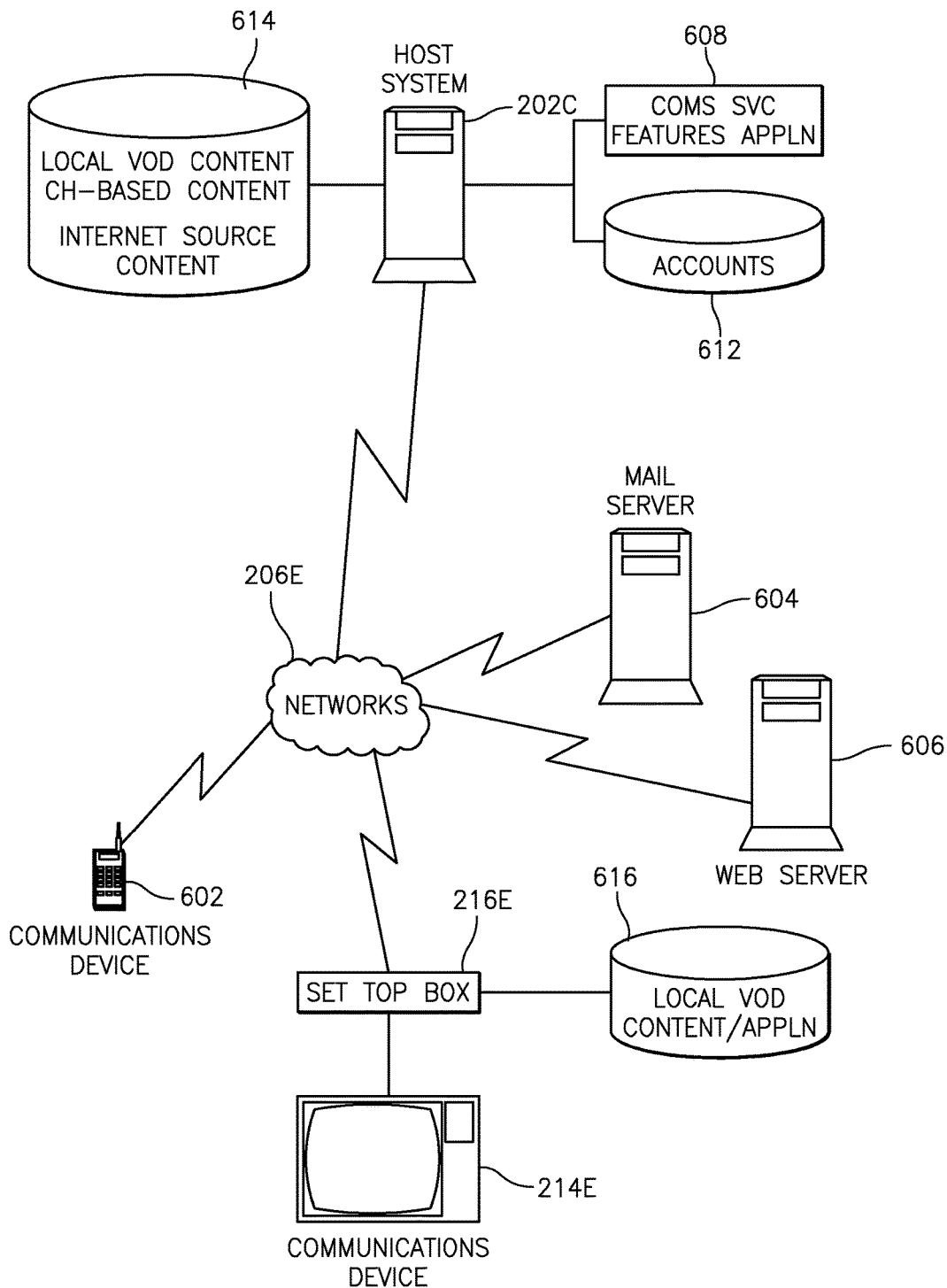
FIG. 16 is a block diagram of a portion of the network convergence infrastructure for implementing communications messaging services in exemplary embodiments.

As indicated above, communications messaging services 112 may be implemented via the network convergence infrastructure 102. The communications messaging services 112 provide various messaging and content delivery functions to subscribers of IPTV-enabled devices. Turning now to FIG. 16, a block diagram of a portion of the network convergence infrastructure 102 for implementing communications messaging services 112 will now be described in exemplary embodiments. The system of FIG. 16 includes elements similar to those described in FIGS. 2, 4, 9, 11, 12, 14, and 15. To this extent, these elements will not be further described.

The system of FIG. 16 includes a host system 202C in communication with communications devices 602 and 214E, a mail server 604 and a web server 606 over networks 206E. Host system 202C executes one or more applications for implementing the communications message services 112 described herein. These one or more applications are collectively referred to herein as a communications service features application 608. The communications messaging services 112 provide for the distribution of communications and messaging content to IPTV-enabled devices and include short messaging service (SMS) communications and images transmitted from mobile communications devices, local video-on-demand content, public or private channel-based content, and Internet-based content. The SMS and image communications may be facilitated via network components, such as short messaging service centers (SMSCs), gateway components implemented via, e.g., networks 206E. The host system 202C may provide all or a portion of the functionality required for implementing the receipt, processing, and distribution of electronic messages (e.g., SMS, instant messaging, and email). Alternatively, host system 202C may provide a portion of the functionality; that is, the electronic messages may be processed in a 'store-and-forward' manner to other network elements, e.g., mail server 604 and web server 606, which may provide messaging services to recipient communications devices (e.g., communications device 214E). If the functionality resides solely in the host system 202C, the host system 202C may include a web server component, mail server component, and other components as needed.

The host system 202C may communicate with one or more storage devices, such as storage devices 612 and 614 for implementing the communications messaging services 112. Storage device 612 may store account records for subscribers of the communications messaging services 112. Accounts are established for subscribers and include an identification of the subscriber, an Internet Protocol television address of the subscriber that identifies the IPTV device (e.g., communications device 602, communications device 214E) for which the services are desired and enables the host system 202C to communicate with the IPTV device. The accounts further identify the subscribed service (e.g., electronic messaging, local video-on-demand, channel-based content, and Internet-based content).

Storage device 614 may store various types of content used in providing the communications messaging services 112. For example, storage device 614 may store local video-on-demand content, channel-based content, Internet sources of content, and may temporarily store SMS messages and images awaiting transmission to subscriber devices.

Local video-on-demand services may include providing network storage for personal video content of a subscriber. In addition, the local video-on-demand services enable the subscriber to designate entities authorized to receive or access the video content. For example, a subscriber stores video footage of a family vacation on the network (e.g., storage device 614). The subscriber specifies names and/or IPTV addresses of friends or relatives that are authorized to view the content. The local video-on-demand services provide a means by which authorized viewers may be authenticated to the network system and access the content. The authentication and delivery functions may be implemented via the account information stored in storage device 612.

The channel-based content services provide a means by which subscribers may establish a private or restricted channel of content that is transmitted over one or more networks (e.g., networks 206E) to authorized recipients (e.g., those who have been identified by the subscriber in the corresponding account). Authorized recipients may then access the content from an IPTV device (e.g., communications device 214E) by first authenticating themselves with the network system (e.g., user name and password credentials). These credentials may be the same credentials used in providing the customized content services 106 described above in FIGS. 4-8. A channel-based content subscriber may be a business enterprise that distributes business-related content to its employees via a dedicated channel provided by the communications messaging services 112.

The Internet-based content relates to Internet Protocol-based content that is distributed over an IP network (e.g., streaming video content provided via a content source). The communications messaging services 112 enables subscribers of this service to select from 'channels' or content provider sources and receive selected content via IPTV-enabled devices (e.g., communications device 214E).

Figure 17:
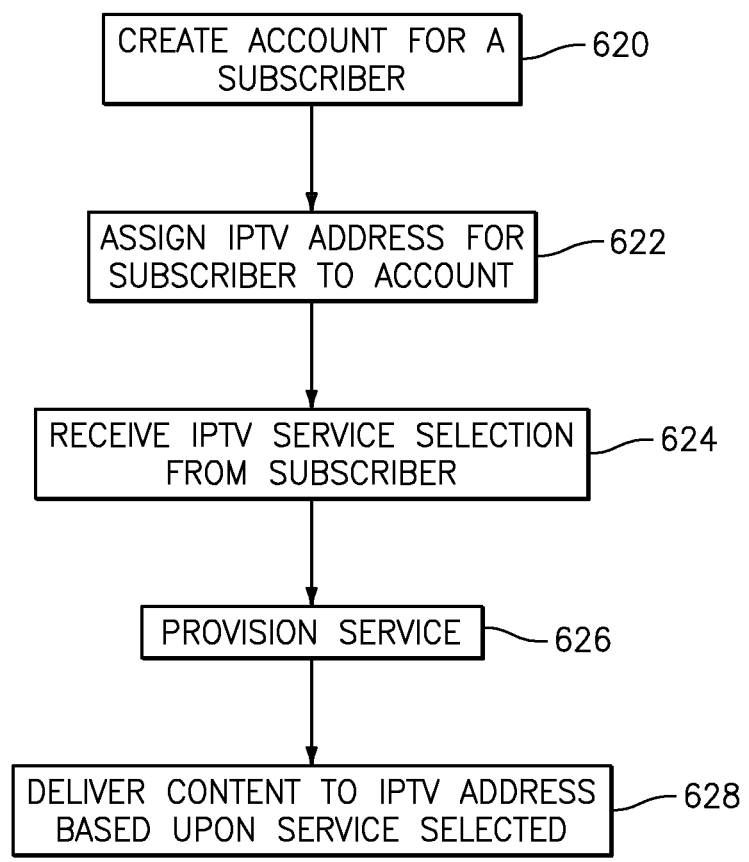
FIG. 17 is a flow diagram of a process for implementing the communications messaging services in exemplary embodiments.

Turning now to FIG. 17, a flow diagram describing a process for implementing the communications messaging services will now be described in exemplary embodiments. At step 620, an account is created for a subscriber of one or more of the communications messaging services 112. One or more IPTV addresses are assigned to the account (or to individual users in the account) at step 622. The IPTV addresses may include a unique identifier and destination information (e.g., a GUID of the set top box 216E of the communications device 214E and a network address).

At step 624, an IPTV service selection is received from the subscriber. The selection may be stored in the account created in step 620. The selected service is provisioned for the subscriber at step 626. Upon receiving a request (and successful validation of the subscriber's credentials), the content may be delivered to the IPTV address of the subscriber, or to an IPTV address of an authorized viewer of the content, depending upon the type of service selected.

The electronic messaging services feature may be implemented using various techniques. In one embodiment, a user of communications device 602 transmits an SMS message to a recipient (e.g., 404-555-5555@domainaddress.non). The SMS message is transmitted over networks 206E to host system 202C. The SMS message is transmitted over networks 206E to host system 202C. The SMS message is delivered to mail server (e.g., mail server component of host system 202C) that services the destination address of the recipient. The communications services feature application 608 receives the SMS message from the mail server. If an image or video is attached, it is removed from the SMS message and stored in a repository (e.g., storage device 614) or web server 606. A uniform resource locator for the repository is provided in the forwarding instructions. When the recipient set top box 216E receives the SMS message and instructions, it accesses the uniform resource locator to retrieve the image, which is displayed with the SMS message on the IPTV device 214E.

Figure 18:
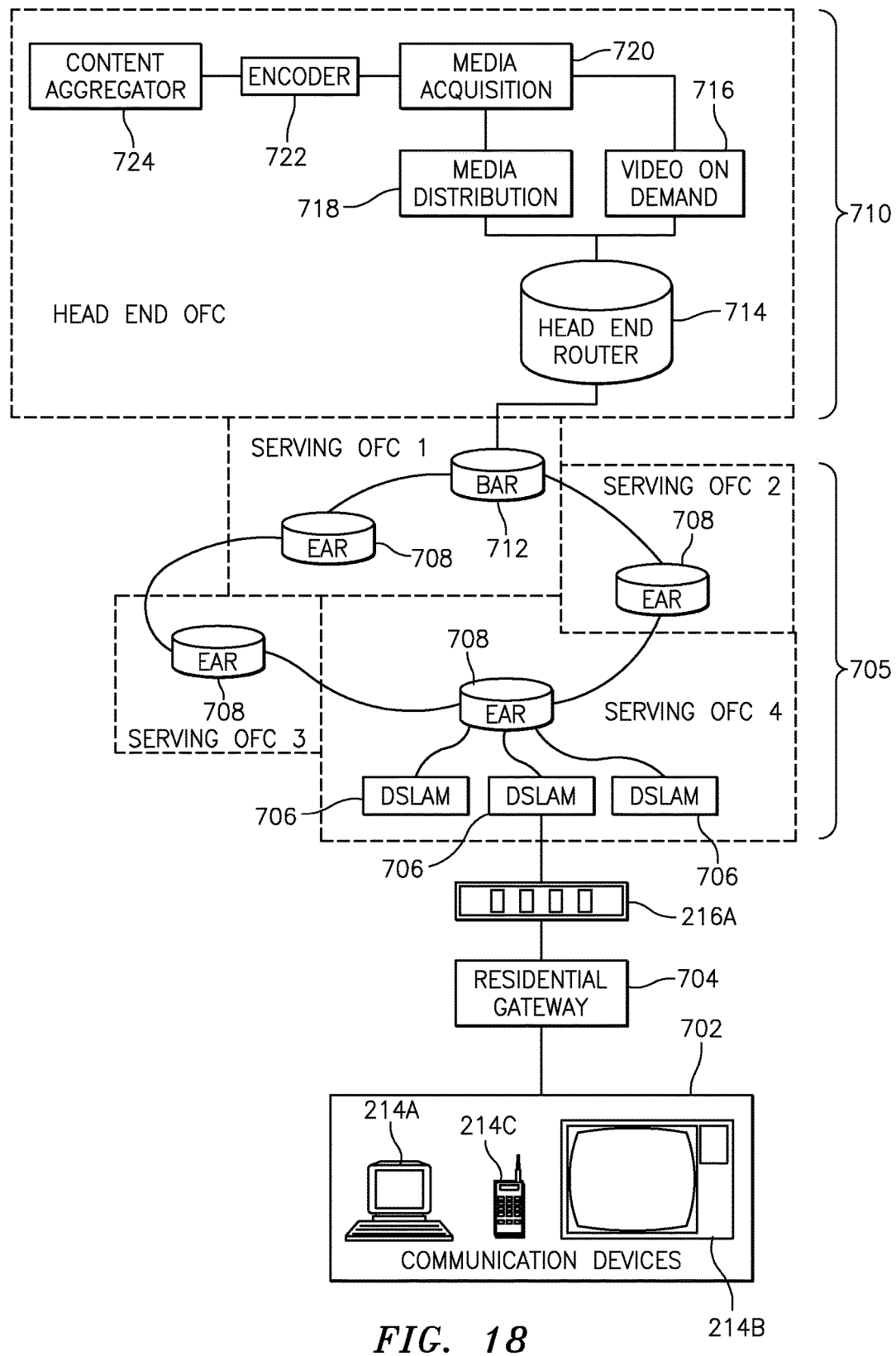
FIG. 18 is a block diagram of a high level view of the network convergence infrastructure for use in implementing emergency alerts and notifications, network visualization services, and neural network services in exemplary embodiments.

FIG. 18 is a high-level view of an exemplary system architecture for implementing an IPTV system. A customer premises 702 includes IPTV client devices which may be televisions 214B coupled to set top boxes (STBs), wireless devices 214C, computing devices 214A, etc. The devices are addressable by a device address such as a GUID, MAC address, SIM identifier, etc. The STBs (not shown) are coupled to a residential gateway 704 and then to a communication device 216A, such as a DSL modem. The STB may also include a digital video recorder (DVR) or be coupled to a DVR for storing information and content as described herein.

A distribution network 705 may interface with the DSL modem 216A through a digital subscriber line access multiplexor (DSLAM) 706. The DSLAM 706 may communicate with various video serving offices (VSOs) (e.g., SERVING OFCs 1-4) via edge aggregation routers (EARs) 708. At least one VSO may interface with a video head end office (VHO) (e.g., HEAD END OFC) 710 through a broadband aggregation router (BAR) 712. The VHO 710 interfaces with the BAR 712 through a head end router (IHR) 714 which communicates with multiple systems for distributing content. At least one content system may include a video-on-demand unit 716 for providing content upon request by an IPTV client. Other content sources may include a media distribution system 718, which may deliver broadcast content on a national or regional basis. A media acquisition system 720 may receive content from an encoder 722 that formats content from a content aggregator 724. It is understood that the system components in FIG. 18 may be interconnected using a variety of network technologies including wired and wireless technologies such as LAN, WAN, Internet, ATM, PSTN, Ethernet, 802.11, etc.

The system architecture depicted in FIG. 18 may be used in implementing one or more of the consolidated monitoring system services 106-118 as described below.

Figure 19:
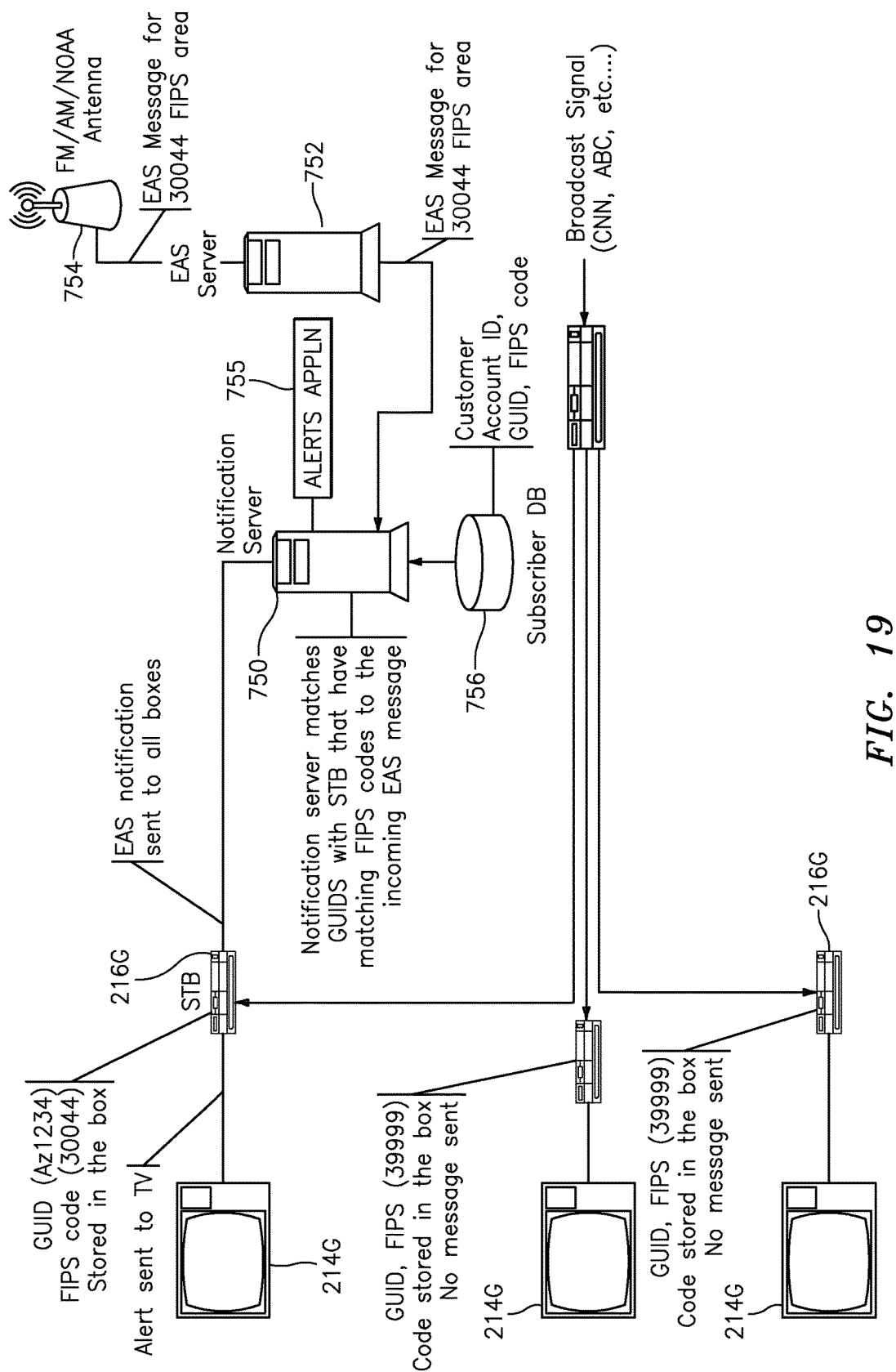
FIG. 19 is a block diagram of a portion of the network convergence infrastructure for implementing emergency alerts and notification services in exemplary embodiments.

As indicated above, emergency alerts/notification services 114 may be implemented via the network convergence infrastructure 102. The emergency alerts/notification services 114 enable information service providers to distribute important emergency information or alerts relating to, e.g., weather events or natural disasters, man-made disasters (e.g., chemical spills), and/or public safety events (e.g., AMBER alerts) over a network to Internet Protocol television-enabled devices. Turning now to FIG. 19, a block diagram of a portion of the network convergence infrastructure 102 for implementing emergency alerts/notification services 114 will now be described in exemplary embodiments. The system of FIG. 19 includes elements similar to those described in FIGS. 2, 4, 9, 11, 12, 14, 15, 16, and 18. To this extent, these elements will not be further described.

IPTV devices 214G may receive programming from STBs 214G in a manner known in the art. An IPTV notification server 750 is coupled to the STBs 214G through an IP network. The notification server 750 may execute an alerts application 755 to implement the emergency alert/notification services 114 described herein. The notification server 750 may also be in communication with a storage device 756 that stores subscriber account information (e.g., account identifications, GUID or IPTV device identifiers, IPTV device addresses, geographic information, such as zip codes or FIPS codes, etc.).

An emergency alert server (EAS) 752 is coupled to the notification server 750 and an alert source 754 (e.g., an AM/FM/NOAA antenna). The EAS 752 monitors AM/FM/NOAA bands from antenna 754 for emergency announcements. If an emergency announcement is received at the EAS 752, a geographic code associated with the emergency announcement is parsed. The geographic code may be a zip code, a federal information processing standards (FIPS) code etc. The notification server 750 may be provided with the emergency announcement and the corresponding geographic code.

The notification server 750 may operate in two modes. In a first mode, the emergency announcement is delivered only to the STBs that are subscribed to the alerts/notification services 114 and located in a region corresponding to the geographic code associated with the emergency announcement. According to exemplary embodiments, the notification server 750 may determine the STBs subscribed to the alerts/notification services 114 and located in the region corresponding to the geographic code by reviewing account information corresponding to the STBs. In particular, the notification server 750 may review account information to determine the accounts including geographic information that matches the geographic code associated with the emergency announcement and may retrieve the IPTV device addresses corresponding to the accounts including geographic information matching the geographic code. The notification server 750 may then send the emergency announcement to the STBs associated with the retrieved IPTV device addresses. This reduces bandwidth usage on the IPTV network.

In an alternate embodiment, the notification server 750 sends the emergency announcement and the associated geographic code to all STBs that are subscribed to the alerts/notification services 114. According to an exemplary embodiment, the notification server 750 may determine the STBs subscribed to the alerts/notification services 114 by reviewing account information corresponding to the STBs. The STBs may then ignore or display the emergency announcement depending on whether the STB location corresponds to the geographic code in the emergency announcement.

The notification server 750 may communicate with other notification servers 750 or 'upstream' content providers for receiving and distributing the alerts. For example, the notification servers may operate using a system architecture similar to that depicted in FIG. 18 whereby content originates from a head end office (e.g., office 710) and is distributed based upon, e.g., geographic regions to one or more of serving offices (e.g., servicing offices 705) to end devices.

As indicated above, network visualization services 116 may be implemented via the network convergence infrastructure 102. The network visualization services 116 enable a network user and a network provider's technician teams to monitor network performance. Various metrics may be provided to the user through the network visualization services 116 as described herein. These services 116 may then be used to identify performance issues, causes, and potential solutions.

Figure 20:
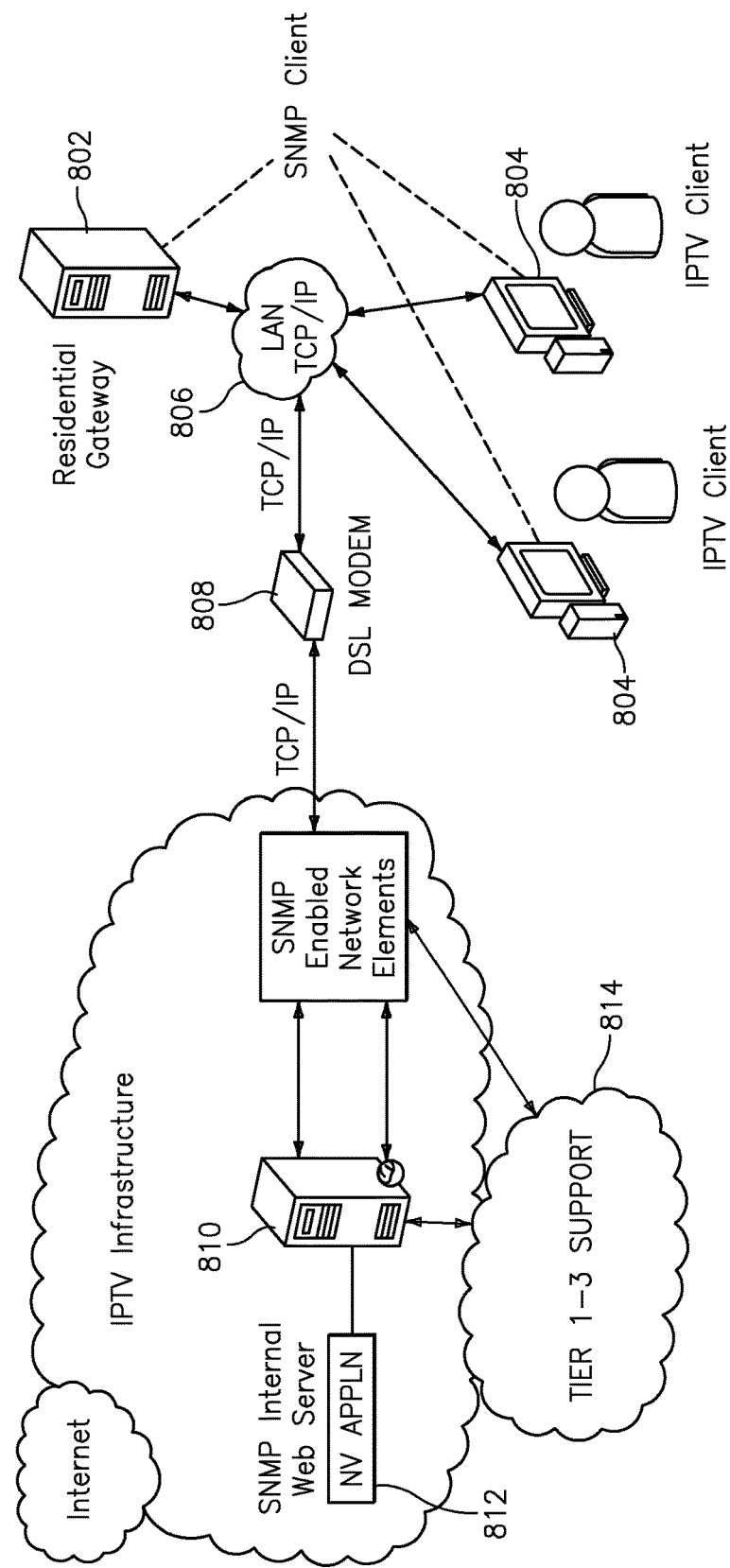
FIG. 20 is a block diagram of a portion of the network convergence infrastructure for implementing network visualization services in exemplary embodiments.
Figure 21:
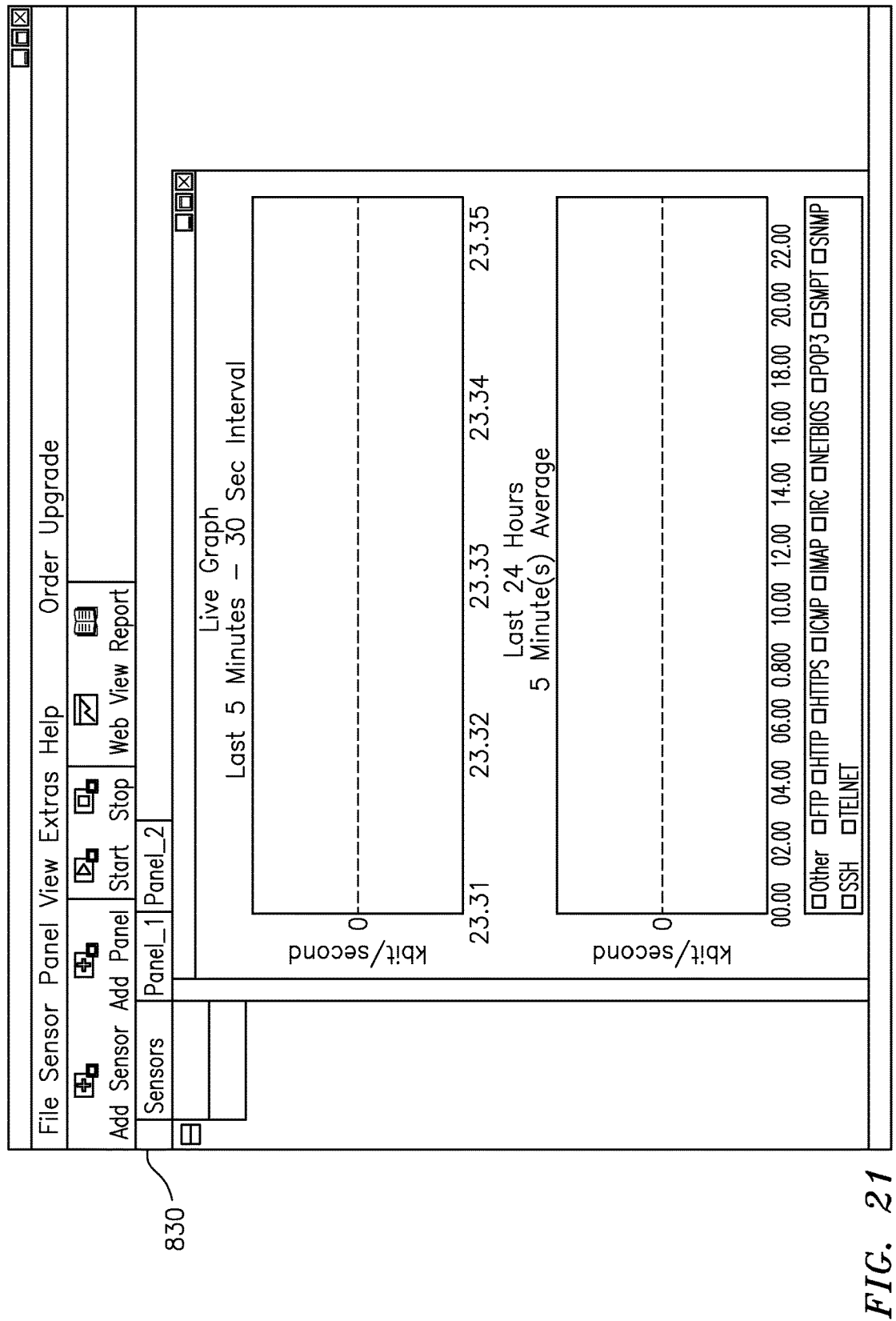
FIGS. 21 through 23 are user interface screens depicting network and media performance data facilitated via the network visualization services in exemplary embodiments.
Figure 22:
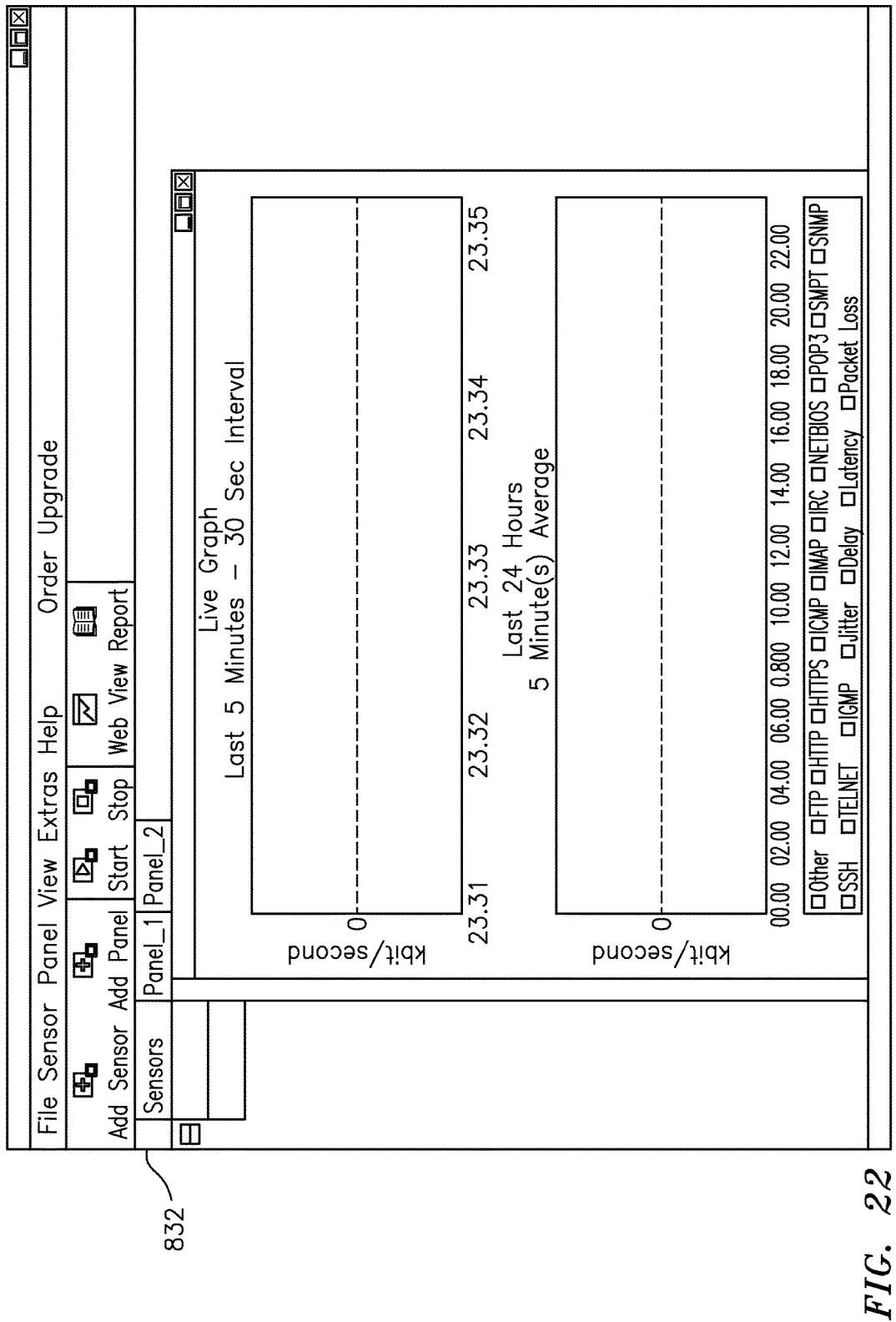
Figure 23:
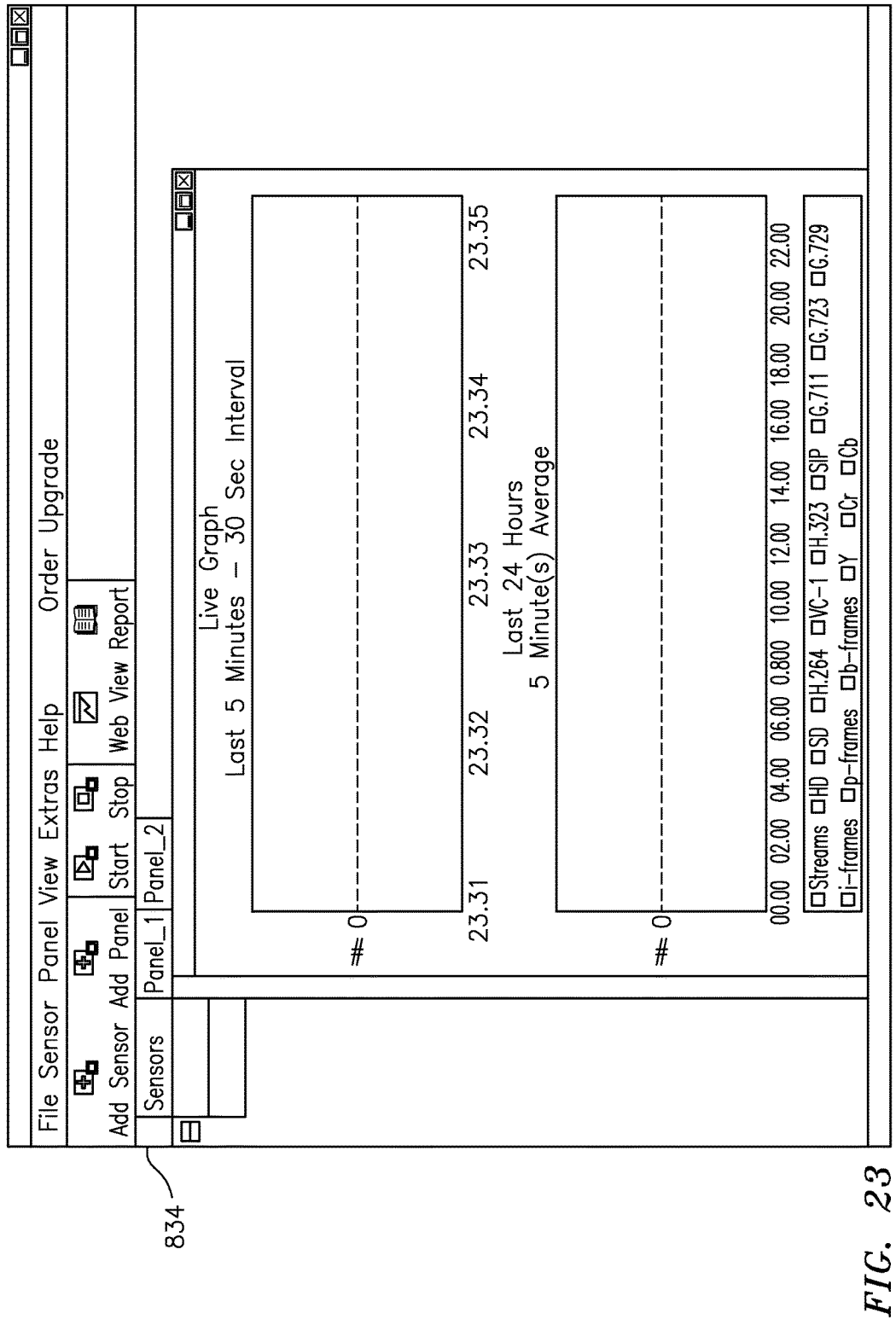

Turning now to FIG. 20, a block diagram of a portion of the network convergence infrastructure 102 for implementing network visualization services 116 will now be described in exemplary embodiments. The system of FIG. 20 includes elements similar to those described in FIGS. 2, 4, 9, 11, 12, 14, 15, 16, 18 and 19. To this extent, these elements will not be further described.

FIG. 20 illustrates IPTV network components for facilitating the network visualization services 116. As shown in the system of FIG. 20, a residential gateway server 802 and two IPTV clients 804 including STBs are coupled to a local area network (LAN) 806. The IPTV clients 804 and residential gateway 802 may execute a Simple Network Management Protocol (SNMP) client that monitors network performance with respect to the IPTV client activities. The network visualization services 116 may enable certain quality parameters to be measured and monitored, such as latency, jitter, delay, etc. The SNMP client may be implemented using a proprietary tool or may be implemented using an off-the-shelf product, e.g., PRTG Traffic Grapher™ by Paessler Incorporated.

An internal server 810 (also referred to herein as 'network monitoring system') implements an SNMP client as well within the IPTV infrastructure. For example, internal server 810 may be implemented at a central office, serving office (e.g., office 705 of FIG. 18), and/or head end office (e.g., head end office 710 of FIG. 18). Each of the offices may communicate via SNMP client-enabled internal servers for sharing network and media performance data gathered by their respective regions. The sharing of information may be used to identify potential sources of network contention, e.g., upstream-originating issues that affect down-stream offices and serving areas. The network visualization application 812 may identify individual IPTV network clients (e.g., clients 804) via, e.g., an account that is established for each respective IPTV client that subscribes to the network visualization services 116. The account may be implemented in a similar fashion as that described above with respect to the customized content services 106 of FIGS. 4 through 8 or other accounts described with respect to the consolidated system services 106-118. The accounts may be used to distribute client-specific (e.g., IPTV client device) performance data to respective IPTV devices.

Various metrics may be provided to the IPTV client user through the network visualization services 116. The metrics may be viewed over a period time such as minutes, hours, days, etc. The metrics may be presented in graphical formats showing real time metrics for network traffic and a separate window for metrics over a period of time (e.g., last 24 hours). The user may access the network visualization services 116, e.g., through a guide on the STB. The guide may include technical phone numbers or other contact information for requesting technical assistance. Users may see metrics related to their local service. The network provider technicians (phone support, field technicians, etc.) can see metrics for much wider portions, or the entire network, as shown in network cloud 814 of FIG. 20 (e.g., Tiered support). The network provider technicians may also monitor network performance using SNMP-enabled clients if desired.

Some of the metrics may include a number of B frames, I frames, P frames, number and types of media streams, latency, jitter, delay, frame loss, packet loss, luminance quality, chrominance quality, etc. The number of high definition and standard definition channels viewed may be collected and tracked. The network visualization tool can generate a score for media streams and/or for the entire IPTV network. Other metrics may include monitoring of encoding (H.264 or VC-1 from Microsoft®) to determine the number of streams. Voice and/or video telephony signaling (session initiation protocol (SIP), H.323) may be monitored to indicate when calls were made. Voice streams such as raw voice (G7.11) or compressed voice streams (G.723/G.729/G.726) may be monitored to determine types of voice streams to/from the household (e.g., the IPTV clients for LAN 806. Graphical depictions of network performance data are shown in user interface screens 830, 832, and 834 of FIGS. 21-23, respectively.

The network visualization application 812 may be configured to establish parameters for performance ranges (e.g., minimum and maximum data values for defining acceptable versus unacceptable performance) or other performance range criteria and values. The parameters may be used as a baseline to identify the existence of a performance issue as well as a severity measure for the issue.

In determining a cause of a condition relating to network and media performance, the network visualization application 812 may be configured to query external systems (e.g., peer serving offices 705, content sources, such as AM/FM/NOAA antenna 754 of FIG. 19) in assessing potential causes of performance conditions.

Figure 24:
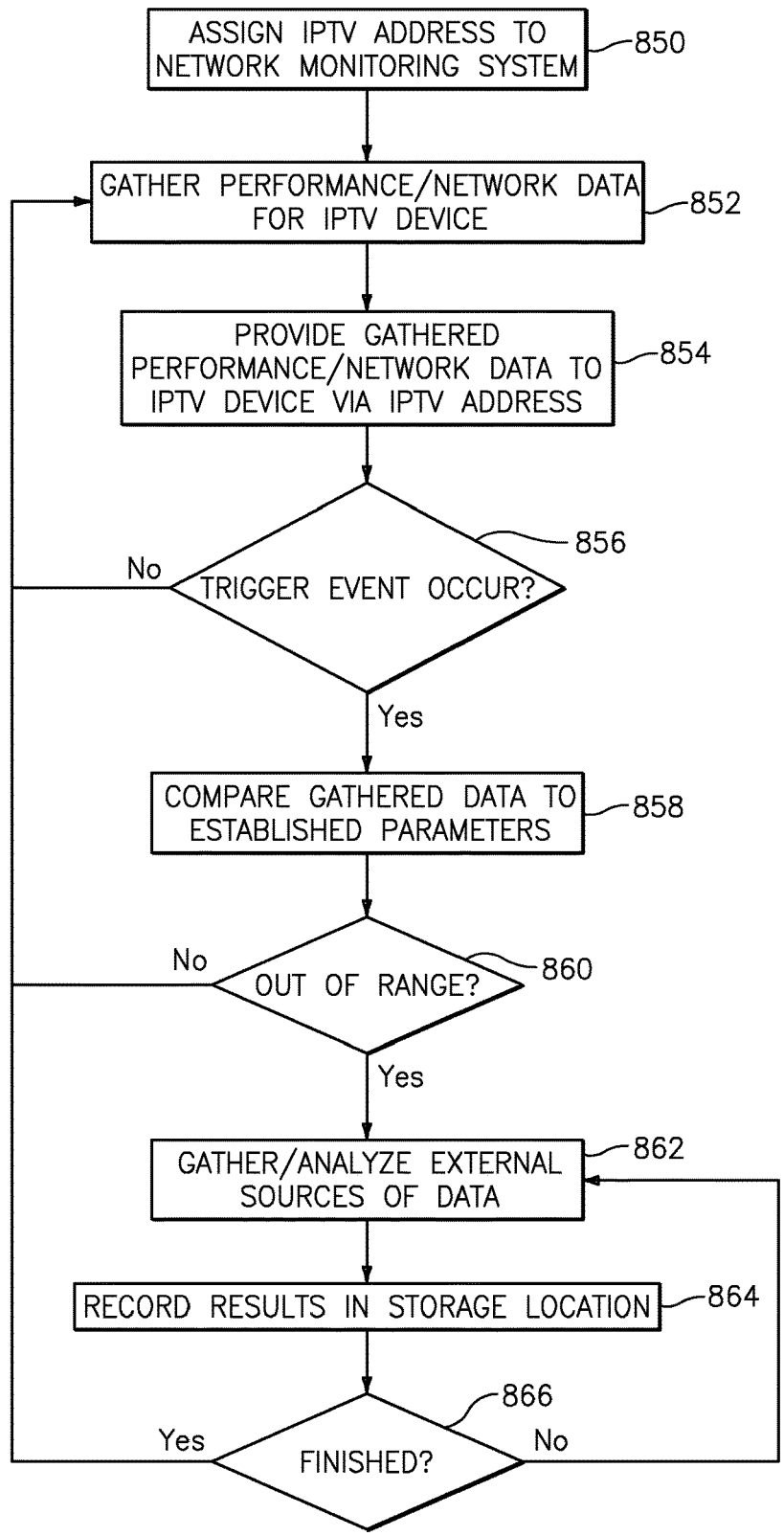
FIG. 24 is a flow diagram describing a process for implementing the network visualization services in exemplary embodiments.

Once the data has been gathered for a particular IPTV client and/or a community of IPTV clients (e.g., via serving offices 705 and/or head end office 710), the data may be used to identify issues and causes of any perceived problems associated with network performance. Turning now to FIG. 24, a flow diagram describing a process for implementing the network visualization services 116 will now be described in accordance with exemplary embodiments.

At step 850, an IPTV address is assigned to a network monitoring system (e.g., internal server 810). The IPTV address may be used to establish a communication session with the IPTV client device 804 and/or to gather network and media performance data from the IPTV client device 804. The network monitoring system gathers performance and media data for the IPTV client device, as well as other IPTV client devices to which it has been assigned at step 852.

At step 854, the performance data gathered is transmitted (e.g., in real time) to the IPTV client 804 using the IPTV client address in the account. At step 856, it is determined whether a triggering event has occurred. A triggering event may be a condition, the occurrence of which causes the network visualization application 812 to perform an analysis of a user's network and media performance. The triggering event may be a simple request from the respective IPTV client 804 to perform an analysis. Alternatively, the triggering event may be an issue detected with respect to a network device or system through which service is provided to subscribers. Alternatively, the triggering event might be a periodic or scheduled sampling and analysis by a network service provider.

If no triggering event has occurred, the process returns to step 852 whereby the network monitoring system 810 continues to monitor the assigned IPTV client(s). Otherwise, the network visualization application 812 compares the gathered data to parameters established for the device (e.g., based upon a service level package) or a defined network performance value (e.g., acceptable versus unacceptable) at step 858. If the performance data gathered within a range specified by the parameters at step 860, the process returns to step 852 whereby the network monitoring system 810 continues to gather performance data. Otherwise, the network monitoring system 810 gathers and analyzes external sources of network performance data in order to determine a cause or origination of the issue resulting in the out-of-range performance values at step 862. As indicated above, the external sources of information may come from other network monitoring systems located in a nearby region (e.g., serving offices 705, weather information provider, emergency information provider, power supplier, etc.). The results of the analysis are recorded in storage of the network monitoring system 810 at step 864.

At step 866, if the network monitoring system 810 has completed its analysis, the process returns to step 852. Otherwise, the process returns to step 862 whereby additional external information gathering may be conducted. The information recorded may be used to provide neural network services 118 as described herein. In this context, the term neural-network services refers to analysis capabilities that may be implemented using actual neural networks, simulated neural networks, or conventional computer processing systems designed to manage complex systems efficiently.

As indicated above, neural network services (also referred to herein as media content analysis, distribution, and re-allocation services) 118 may be implemented via the network convergence infrastructure 102. The neural network services 118 provide a means for determining how to allocate content across an IPTV network based upon factors or decision criteria, such as forecasted demand, network contention issues, planned network maintenance, etc. These factors may be quantified by metrics, e.g., bandwidth availability/capacity, CPU processing requirements, and disk storage constraints across the network. In addition, the decision criteria and metrics may be generated or modified by a service provider or other entity as needed.

Figure 25:
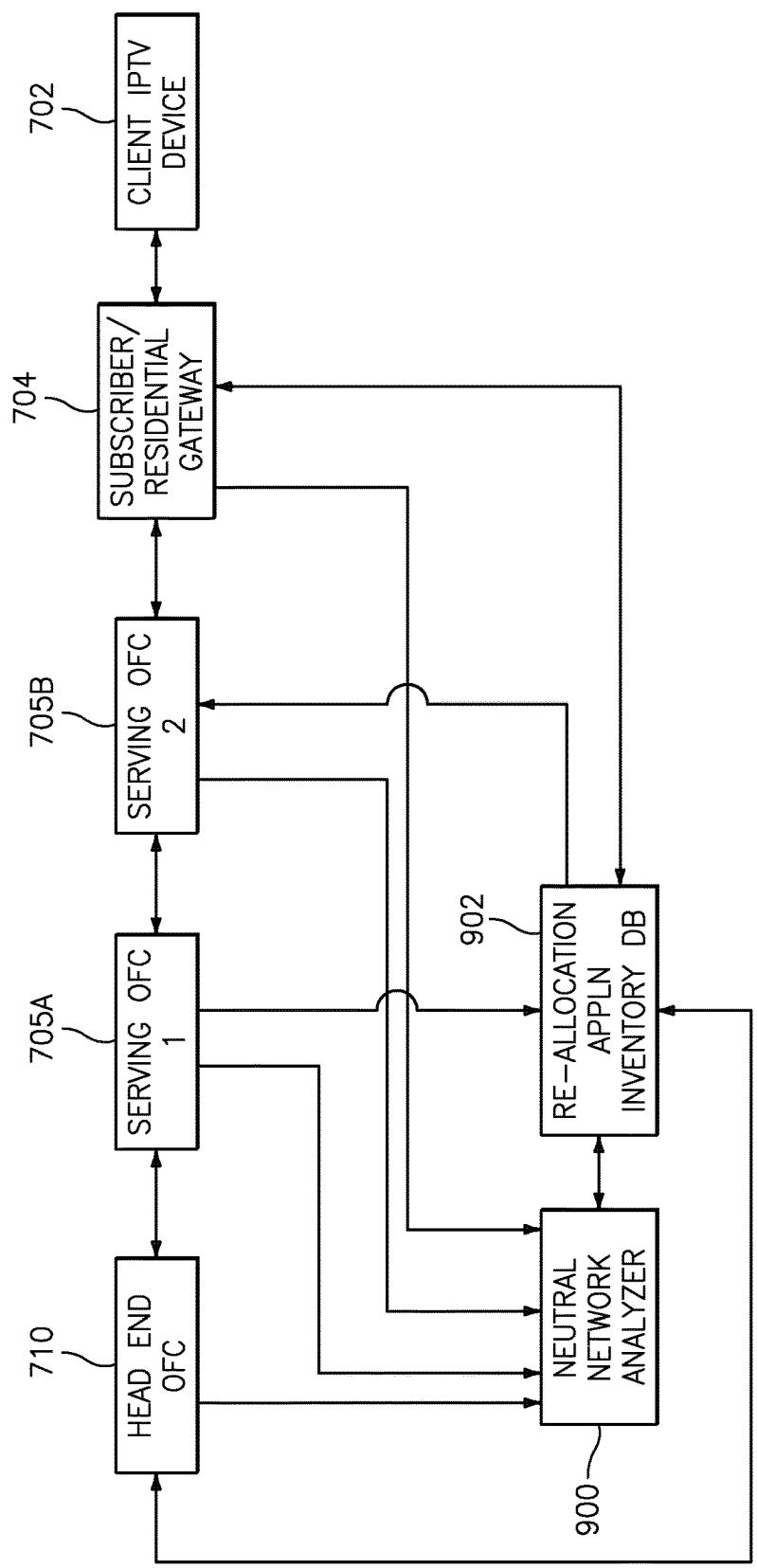
FIG. 25 is a block diagram of a portion of the network convergence infrastructure for implementing neural network (media content analysis, distribution, and re-allocation) services in exemplary embodiments.

Turning now to FIG. 25, a block diagram of a portion of the network convergence infrastructure 102 for implementing neural network services 118 will now be described in exemplary embodiments. The system of FIG. 25 includes elements similar to those described in FIGS. 2, 4, 9, 11, 12, 14, 15, 16, 18, 19, and 20. To this extent, these elements will not be further described.

As indicated above, the neural network services 118 enable a service provider to determine how to allocate content (e.g., music, video, data, etc.) across an IPTV network. Content may be stored and distributed from multiple sources in the IPTV network. While broadcast content is viewable at a certain time, other content may be provided on a video-on-demand (VOD) basis and can be stored in variety of locations including a video head end (e.g., head end office 710), video serving office (e.g., servicing offices 705A and 705B), a DVR at a gateway device 704 (e.g., a set top box in communication with an IPTV device) at the user premises, etc. Given these multiple storage locations, a determination may be made of the optimum location for storing content.

The system of FIG. 25 depicts a neural network analyzer 900 that utilizes, e.g., principles of neural networks for continuously re-calculating and re-allocating content within a media distribution application layered over an IP network in determining where content may be stored. The neural network analyzer 900 may be implemented, e.g., using a computer processing device in communication with offices 710 and 705. According to an exemplary embodiment, the neural network analyzer 900 is capable of learning and adjusting as the network topology changes (e.g., adding components to the network, such as routers, switches, etc.) and as the costs of transport changes. A reallocation application and inventory database 902 may be in communication with the neural network analyzer 900. The reallocation application 902 handles the movement of content from one location to another (e.g., from serving office 705A to serving office 705B) in response to input from the neural network analyzer 900. The inventory database maintains the location of content on the network such that the IPTV network knows where to locate the content when needed.

The neural network analyzer 900 may determine an optimum storage position for content so that the customer can access content quickly (which promotes storage near the client) while still reducing total storage consumed by the content (which promotes storage at the VHE). The neural network analyzer 900 may balance these competing interests to determine optimum placement of content.

In addition, the content may be stored in a tiered fashion (e.g., where high-demand content is pushed into a storage location closer to the receiving devices, while low-demand content is allocated to a remote storage location). The anticipated demand described above is one of many decision criteria that may be used in establishing and utilizing tiered storage. It will be understood that multiple levels or tiers of storage throughout the network may be determined as desired.

As indicated above, the neural network analyzer 900 may consider a variety of factors in determining where to store content. Popularity of the content may be one factor. Time of day when the content is typically requested may be another factor. The cost to deliver the content in terms of network cost and the cost of storage space at different locations may be additional factors. The neural network analyzer 900 adapts to changing conditions on the IPTV network to alter storage locations for content. This may be implemented, e.g., via a learning algorithm. The reallocation application 902 directs the movement of content across the network and the inventory database is updated to reflect where content is stored.

The neural network analyzer 900 may react to current network conditions and predicted demand for content. Some of this information may be obtained, e.g., from activities conducted via the network visualization services 116 described above. Statistical data relating to who, what, where, and when content is accessed by content receiving devices (e.g., communications devices 114), or other network nodes, e.g., set top boxes, residential gateways, remote terminal devices, serving/head end offices, content providers, etc., may be collected via the neural network analyzer 900. The data is aggregated such that a service provider receives non-customer specific information in order to protect privacy interests. The network analyzer 900, in conjunction with the reallocation application 902, provides a deterministic calculation (and continual re-calculation) of where to strategically place content in order to minimize impact to the network while maximizing service delivery.

Certain content determined to be popular during specified seasons may be allocated accordingly due to seasonal demand. For example, the Ten Commandments is popular around Easter, and the neural network services 118 may distribute this film closer to the clients (e.g., IPTV client device 702) to reduce the effect on total network resources. In other words, moving content from the head end 710 to the serving office 705A and/or 705B in anticipation of high demand will conserve transport resources of the IPTV network. Once the anticipated demand is returned to normal levels, the re-allocated content may be returned to its original storage location.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method, comprising:
    storing, in an account of a subscriber, a globally unique identifier for each of a plurality of Internet Protocol-enabled devices associated with the subscriber;
    for each of the plurality of Internet Protocol-enabled devices, appending the globally unique identifier to a network address of the subscriber in the account, wherein each of the plurality of Internet Protocol-enabled devices is uniquely addressable via the appended globally unique identifier and network address;
    provisioning a subscriber-selected communications service for the account;
    assigning, to the account, subscriber-selected permissions for defining access to features of the communications service for individuals specified in the account with respect to a corresponding Internet Protocol-enabled device, the permissions being assigned based on a combined user identifier and corresponding globally unique identifier, the permissions including time-based restrictions to inbound and outbound communications;
    providing the communications service to the individuals associated with the account subject to the permissions; and
    storing, in a storage device associated with the account, content corresponding to the subscriber-selected communications service, the content including messages, local video-on-demand content, and channel-based content, wherein the permissions are configured to be assigned by the subscriber on a per-user basis for the individuals specified in the account such that a first individual can have the permissions different than a second individual of the individuals;
    communicating an emergency announcement associated with a geographic code to the plurality of Internet Protocol-enabled devices, in response to determining that the plurality of Internet Protocol-enabled devices are associated with the geographic code.

2. The method of claim 1, wherein the provisioned communications service is electronic messaging, the method further comprising:
    receiving an electronic message including text and a destination address, sending the electronic message to a recipient device based upon the destination address.

3. The method of claim 2, wherein the electronic message includes an image attachment, the method further comprising:
    setting a parameter in forwarding instructions of the electronic message to reflect the image attachment;
    removing the image attachment from the electronic message and storing the image attachment in a repository; and
    providing a uniform resource locator for the repository in the forwarding instructions.

4. The method of claim 1, wherein the provisioned communications service selected is channel-based content provisioned by a commercial content service provider, the method further comprising:
    establishing a dedicated communications channel for the subscriber; and
    transmitting the channel-based content, over the dedicated communications channel, to individuals specified in the account subject to the permissions.

5. The method of claim 1, wherein the provisioned communications service selected is Internet-based content services, the method further comprising:
    receiving a selection of Internet-based content sources from the subscriber;
    storing the selection in the account; and
    presenting Internet-based content from the selection to a subscriber-selected Internet Protocol-enabled device upon a request by the subscriber.

6. The method of claim 1, wherein the emergency announcement is communicated to the plurality of Internet Protocol-enabled devices in response to the plurality of Internet Protocol-enabled devices having subscribed to alert services.

7. The method of claim 1, further comprising accessing account information to determine geographic information of the plurality of Internet Protocol-enabled devices that matches the geographic code associated with the emergency announcement.

8. The method of claim 1, wherein the permissions include assigning destination address based restrictions to communications.

9. A system, comprising:
    a memory comprising computer-executable instructions; and
    a processor executing the computer-executable instructions, the computer-executable instructions when executed by the processor cause the processor to perform operations comprising:
    storing, in an account of a subscriber, a globally unique identifier for each of a plurality of Internet Protocol-enabled devices associated with the subscriber;
    for each of the plurality of Internet Protocol-enabled devices, appending the globally unique identifier to a network address of the subscriber in the account, wherein each of the plurality of Internet Protocol-enabled devices is uniquely addressable via the appended globally unique identifier and network address;

provisioning a subscriber-selected communications service for the account;
assigning, to the account, subscriber-selected permissions for defining access to features of the communications service for individuals specified in the account with respect to a corresponding Internet Protocol-enabled device, the permissions being assigned based on a combined user identifier and corresponding globally unique identifier, the permissions including time-based restrictions to inbound and outbound communications;
providing the communications service to the individuals associated with the account subject to the permissions; and
storing, in the memory, the memory associated with the account, content corresponding to the subscriber-selected communications service, the content including messages, local video-on-demand content, and channel-based content, wherein the permissions are configured to be assigned by the subscriber on a per-user basis for the individuals specified in the account such that a first individual can have the permissions different than a second individual of the individuals;
communicating an emergency announcement associated with a geographic code to the plurality of Internet Protocol-enabled devices, in response to determining that the plurality of Internet Protocol-enabled devices are associated with the geographic code.

10. The system of claim 9, wherein the provisioned communications service is electronic messaging, the operations further comprising:
receiving an electronic message including text and a destination address, sending the electronic message to a recipient device based upon the destination address.

11. The system of claim 10, wherein the electronic message includes an image attachment, the operations further comprising:
setting a parameter in forwarding instructions of the electronic message to reflect the image attachment;
removing the image attachment from the electronic message and storing the image attachment in a repository; and
providing a uniform resource locator for the repository in the forwarding instructions.

12. The system of claim 9, wherein the provisioned communications service selected is channel-based content services, the operations further comprising:
establishing a dedicated communications channel for the subscriber; and
transmitting channel-based content, over the dedicated communications channel, to individuals specified in the account subject to the permissions.

13. The system of claim 9, wherein the provisioned communications service selected is Internet-based content services, the operations further comprising:
receiving a selection of Internet-based content sources from the subscriber;
storing the selection in the account; and
presenting Internet-based content from the selection to a subscriber-selected Internet Protocol-enabled device upon a request by the subscriber.

14. The system of claim 9, wherein the permissions include assigning destination address based restrictions to communications.

15. A computer program product comprising a non-transitory computer-readable storage medium having instructions embodied thereon, which when executed by a computer cause the computer to implement operations, comprising:
storing, in an account of a subscriber, a globally unique identifier for each of a plurality of Internet Protocol-enabled devices associated with the subscriber;
for each of the plurality of Internet Protocol-enabled devices, appending the globally unique identifier to a network address of the subscriber in the account, wherein each of the plurality of Internet Protocol-enabled devices is uniquely addressable via the appended globally unique identifier and network address;
provisioning a subscriber-selected communications service for the account;
assigning, to the account, subscriber-selected permissions for defining access to features of the communications service for individuals specified in the account with respect to a corresponding Internet Protocol-enabled device, the permissions being assigned based on a combined user identifier and corresponding globally unique identifier, the permissions including time-based restrictions to inbound and outbound communications; and
providing the communications service to the individuals associated with the account subject to the permissions; and
storing, in a storage device associated with the account, content corresponding to the subscriber-selected communications service, the content including messages, local video-on-demand content, and channel-based content, wherein the permissions are configured to be assigned by the subscriber on a per-user basis for the individuals specified in the account such that a first individual can have the permissions different than a second individual of the individuals;
communicating an emergency announcement associated with a geographic code to the plurality if Internet Protocol-enabled devices, in response to determining that the plurality of Internet Protocol-enabled devices are associated with the geographic code.

16. The computer program product of claim 15, wherein the provisioned communications service is electronic messaging, the operations further comprising:
receiving an electronic message including text and a destination address, sending the electronic message to a recipient device based upon the destination address.

17. The computer program product of claim 16, wherein the electronic message includes an image attachment, the operations further comprising:
setting a parameter in forwarding instructions of the electronic message to reflect the image attachment;
removing the image attachment from the electronic message and storing the image attachment in a repository; and
providing a uniform resource locator for the repository in the forwarding instructions.

18. The computer program product of claim 15, wherein the provisioned communications service selected is channel-based content services, the operations further comprising:
establishing a dedicated communications channel for the subscriber; and
transmitting channel-based content, over the dedicated communications channel, to individuals specified in the account subject to the permissions.

19. The computer program product of claim 15, wherein the provisioned communications service selected is Internet-based content services, the operations further comprising:
- receiving a selection of Internet-based content sources from the subscriber;
- storing the selection in the account; and
- presenting Internet-based content from the selection to a subscriber-selected Internet Protocol-enabled device upon a request by the subscriber.

* * * * *